(12) United States Patent
Natsume et al.

(10) Patent No.: US 9,231,430 B2
(45) Date of Patent: Jan. 5, 2016

(54) POWER SUPPLY SYSTEM, CHARGING SYSTEM, AND CHARGING CONTROL DEVICE INCLUDING A BATTERY AND A CHARGING DEVICE WITH A SHAPE OF HEXAGONAL CYLINDER

(75) Inventors: Tetsu Natsume, Chiba (JP); Hiroaki Kitano, Tokyo (JP)

(73) Assignee: SONY CORPORATION, Tokyo (JP)

(*) Notice: Subject to any disclaimer, the term of this patent is extended or adjusted under 35 U.S.C. 154(b) by 385 days.

(21) Appl. No.: 13/823,010

(22) PCT Filed: Sep. 6, 2011

(86) PCT No.: PCT/JP2011/070261
§ 371 (c)(1),
(2), (4) Date: Mar. 13, 2013

(87) PCT Pub. No.: WO2012/036023
PCT Pub. Date: Mar. 22, 2012

(65) Prior Publication Data
US 2013/0169225 A1    Jul. 4, 2013

(30) Foreign Application Priority Data
Sep. 17, 2010   (JP) ................................ 2010-209770

(51) Int. Cl.
| H01M 10/46 | (2006.01) |
| H02J 7/02 | (2006.01) |
| H01M 10/42 | (2006.01) |
| H01M 10/44 | (2006.01) |

(52) U.S. Cl.
CPC ............ *H02J 7/025* (2013.01); *H01M 10/425* (2013.01); *H01M 10/44* (2013.01); *H01M 10/46* (2013.01)

(58) Field of Classification Search
USPC ......................... 320/107, 108, 112, 114, 115; 429/96–100; D13/103
See application file for complete search history.

(56) References Cited

U.S. PATENT DOCUMENTS

| 2005/0189910 A1* | 9/2005 | Hui ............................... 320/108 |
| 2008/0200219 A1 | 8/2008 | Kondo et al. |
| 2009/0096413 A1* | 4/2009 | Partovi et al. ................. 320/108 |
| 2009/0102419 A1 | 4/2009 | Gwon et al. |

(Continued)

FOREIGN PATENT DOCUMENTS

| JP | 2003143761 | 5/2003 |
| JP | 2008206234 | 9/2008 |

(Continued)

*Primary Examiner* — Edward Tso
(74) *Attorney, Agent, or Firm* — Hazuki International, LLC

(57) ABSTRACT

There is provided a charging system including at least one battery device that includes a secondary cell therein, a charging device that performs contactless power transmission to transmit power to the battery device, and a charging control device that controls the contactless power transmission between the charging device and the battery device, wherein the battery device is a hexagonal cylinder having a bottom surface with a substantially regular hexagonal shape and having a predetermined height, wherein the charging device is a hexagonal cylinder having a bottom surface with a substantially regular hexagonal shape and having a predetermined height, and wherein the contactless power transmission is performed between the charging device and the battery device under control of the charging control device by stacking the battery device on the charging device.

14 Claims, 33 Drawing Sheets

(56) References Cited

U.S. PATENT DOCUMENTS

| | | |
|---|---|---|
| 2010/0052431 A1 | 3/2010 | Mita |
| 2014/0361734 A1 * | 12/2014 | Yamazaki et al. ............ 320/108 |

FOREIGN PATENT DOCUMENTS

| | | |
|---|---|---|
| JP | 2009504115 | 1/2009 |
| JP | 2010063245 | 3/2010 |

* cited by examiner

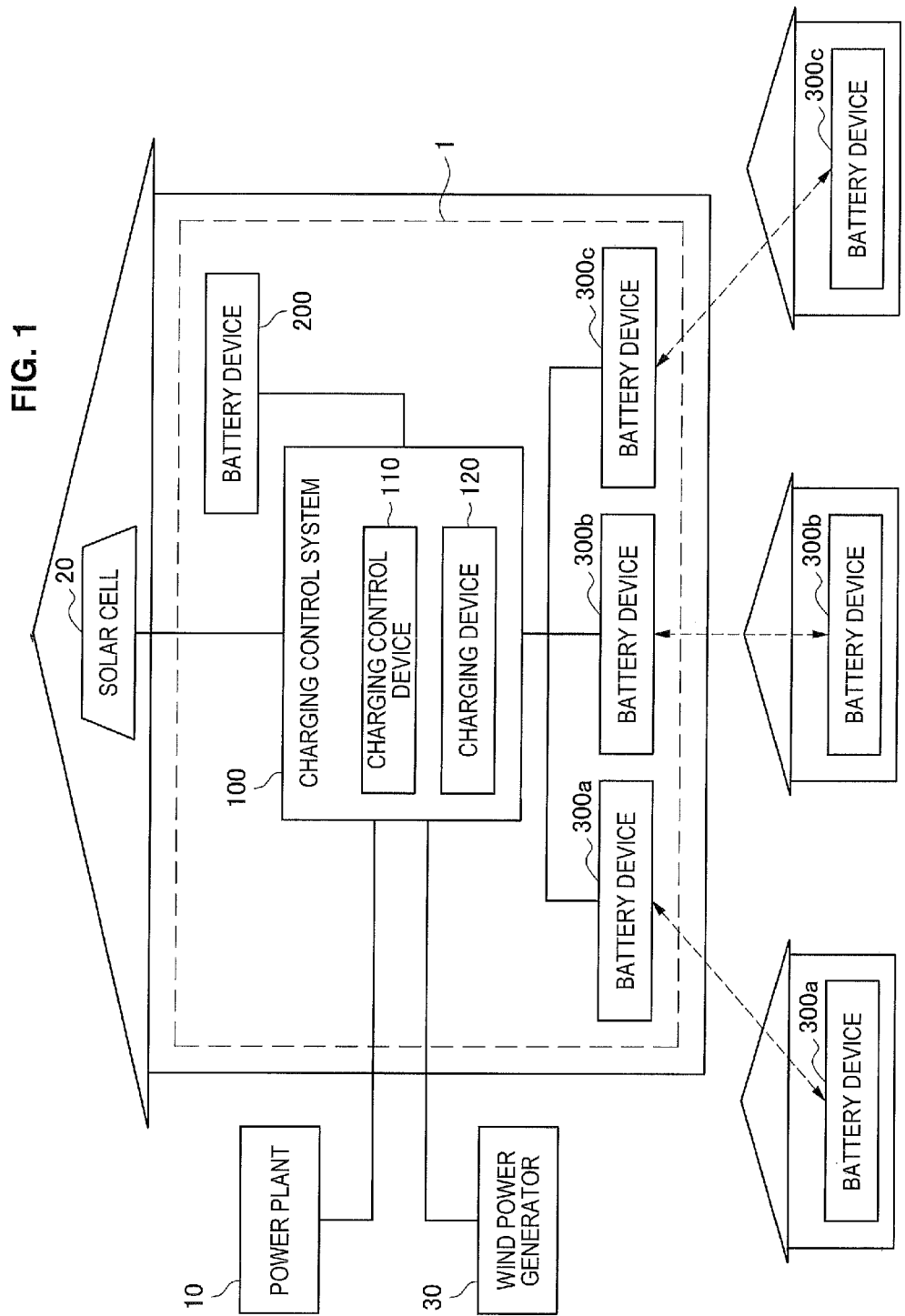

POWER SUPPLY SYSTEM, CHARGING SYSTEM, AND CHARGING CONTROL DEVICE INCLUDING A BATTERY AND A CHARGING DEVICE WITH A SHAPE OF HEXAGONAL CYLINDER

CROSS REFERENCES TO RELATED APPLICATIONS

The present application is a national stage of International Application No. PCT/JP2011/070261 filed on Sep. 6, 2011 and claims priority to Japanese Patent Application No. 2010-209770 filed on Sep. 17, 2010, the disclosure of which is incorporated herein by reference.

BACKGROUND

The present invention relates to a power supply system, a charging control device, and a battery device.

Existing power systems are designed to transmit power generated by power plants to offices or homes via power networks constructed of electric substations, power wires, and the like. Accordingly, to realize power transmission to offices and homes, reliable power networks constructed to transmit power generated by power plants are a prerequisite. Most of the power supply systems of the related art are also designed on the assumption that reliable power networks are installed.

SUMMARY

Technical Problem

In nations or areas in which such power supply systems and power distribution infrastructures are not constructed, however, there is a problem that it is difficult to apply the power supply systems without change. Further, the cost of the power distribution are not considerably lowered even in areas such as developing nations in consideration of power plants, power substations, power distribution infrastructures, and the like. Since it is difficult to maintain power distribution in a workable level from the viewpoint of the economy in such the nations or areas, there is a problem that the infrastructure may not be sufficient or, in the worst case, power failure may occur.

It is expensive to install power wires and supply power to each home in such areas. Further, since power may not be necessary during the day, there is a high probability that appropriate returns from the installation of the power wires in each home may not be obtained.

The present invention is devised in view of the above-mentioned program, an object of the present invention is to provide a novel and improved charging system, a novel and improved charging control device, and a novel and improved battery device of which users can use energy when the users desire to use the energy, which are easy to increase or decrease, and of which initial investment of infrastructures can be reduced.

Solution to Problem

The present invention is provided to solve the above-mentioned issues. According to an embodiment of the present invention, there is provided a charging system including at least one battery device that includes a secondary cell therein, a charging device that performs contactless power transmission to transmit power to the battery device, and a charging control device that controls the contactless power transmission between the charging device and the battery device. The battery device is a hexagonal cylinder having a bottom surface with a substantially regular hexagonal shape and having a predetermined height. The charging device is a hexagonal cylinder having a bottom surface with a substantially regular hexagonal shape and having a predetermined height. The contactless power transmission is performed between the charging device and the battery device under control of the charging control device by stacking the battery device on the charging device.

The battery device may include a hole penetrating through a middle portion of a plane and a guide portion formed around the hole and stacked on the charging device at a matching position. The charging device may include a hole penetrating through a middle portion of a plane and a convex portion formed around the hole at a position corresponding to the guide portion to protrude from an upper surface.

The guide portion may oscillate by a predetermined amount in a direction in which the hole penetrates, and protrudes from the plane of the battery device, when the battery device is stacked on the charging device.

An upper portion of the charging control device may have a same size as the guide portion formed in the battery device and a lower portion of the charging control device may have a size insertable into the hole.

Bottom surfaces of the battery device and the charging device may have same sizes and substantially regular hexagonal shapes.

A handle may be formed in at least one side surface of the battery device.

The charging system may further include a charging tray that has a bottom surface with a same shape as the battery device, and a miniature battery device that is charged by being installed in the charging tray and is a hexagonal cylinder having a bottom surface with a substantially regular hexagonal shape and having a predetermined height.

The present invention is provided to solve the above-mentioned issues. According to another embodiment of the present invention, there is provided a charging system including a battery device that includes a secondary cell therein, a charging device that performs contactless power transmission to transmit power to the battery device, and a charging control device that controls the contactless power transmission between the charging device and the battery device. The battery device is a hexagonal cylinder having a bottom surface with a substantially regular hexagonal shape and having a predetermined height, and includes a hole penetrating through a middle portion of a plane. The charging device performs the contactless power transmission, by being inserted into the hole, between the charging device and the battery device under control of the charging control device.

Advantageous Effects of Invention

According to the embodiments of the present invention described above, it is possible to provide a novel and improved charging system, a novel and improved charging control device, and a novel and improved battery of which users can use energy when the users desire to use the energy, which are easy to increase or decrease, and of which initial investment of infrastructures can be reduced.

Additional features and advantages are described herein, and will be apparent from the following Detailed Description and the figures.

BRIEF DESCRIPTION OF THE FIGURES

FIG. 1 is an illustration of an example of the overall configuration of a power supply system 1 according to an embodiment of the present invention.

FIG. 8 is a perspective view illustrating the outer appearance of a battery device 300a.

FIG. 9A is an illustration of the outer appearance of the battery device 300a.

FIG. 9B is an illustration of the outer appearance of the battery device 300a.

FIG. 9C is an illustration of the outer appearance of the battery device 300a.

FIG. 9D is an illustration of the outer appearance of the battery device 300a.

FIG. 15 is an illustration of a state in which battery devices 300a are installed in the charging tray 400 to charge the battery devices 300a.

DETAILED DESCRIPTION

Figure 2A:
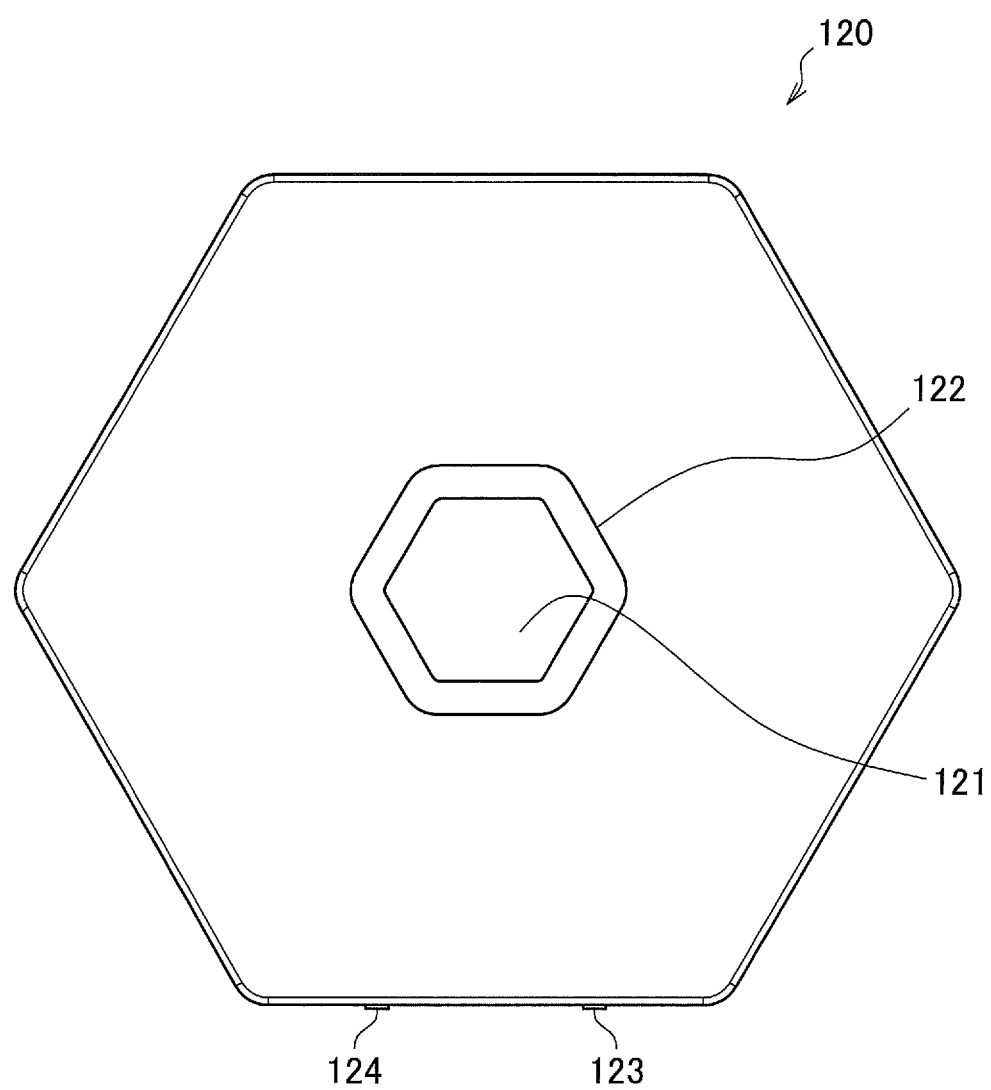
FIG. 2A is an illustration of the outer appearance of a charging device 120 according to the embodiment of the present invention.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

The description will be made in the following order.
<1. Embodiment of the Present Invention>
[1-1. Example of Overall Configuration of Power Supply System]
[1-2. Example of Specific Structure of Each Device]
[1-3. Charging and Discharging Control Processes]
<2. Application Examples>
<3. Summarization>
<1. Embodiment of the Present Invention>
[1-1. Example of Overall Configuration of Power Supply System]

First, an example of the overall configuration of a power supply system according to an embodiment of the present invention will be described. FIG. 1 is an illustration of an example of the overall configuration of a power supply system 1 according to the embodiment of the present invention. Hereinafter, the example of the overall configuration of the power supply system 1 according to the embodiment of the present invention will be described with reference to FIG. 1.

As shown in FIG. 1, the power supply system 1 according to the embodiment of the present invention includes a charging control system 100 and battery devices 200, 300a, 300b, and 300c.

The charging control system 100 charges the battery devices 200, 300a, 300b, and 300c by receiving the supply of power generated by a power plant 10, power generated when the solar cell 20 receives irradiation of sun-light, and power generated when the wind power generator 30 receives wind power and supplying the power to the battery devices 200, 300a, 300b, and 300c.

Needless to say, the power supplied for the charging control system 100 is, of course, not limited to the power generated by the power plant 10, power generated when the solar cell 20 receives irradiation of sun-light, and power generated when the wind power generator 30 receives wind power. The charging control system 100 can receive the power generated by other natural energy.

The charging control system 100 includes a charging control device 110 and a charging device 120, as shown in FIG. 1.

The charging control device 110 controls supply of the power from the charging device 120 to the battery devices 200, 300a, 300b, and 300c and also controls reception of the power from the battery devices 200, 300a, 300b, and 300c to the charging device 120. The charging control device 110 controls the supply of the power, so that the amount of power necessary in the battery devices 200, 300a, 300b, and 300c can be stored.

The charging control device 110 may superimpose information on the power when the charging control device 110 supplies the power from the charging device 120 to the battery devices 200, 300a, 300b, and 300c. By supplying the power on which the information is superimposed from the charging device 120 to the battery devices 200, 300a, 300b, and 300c, the information superimposed on the power can be output to devices connected to the battery devices 200, 300a, 300b, and 300c when the power stored in the battery devices 200, 300a, 300b, and 300c is used.

Accordingly, the charging control device 110 preferably has a communication scheme by which wireless communication with the battery devices 200, 300a, 300b, and 300c is performed therein. As the wireless communication scheme, for example, communication using radio frequency identification (RFID) technology, a wireless communication scheme standardized in conformity with IEEE 802.15, and a short-range wireless communication scheme (Zigbee) standardized in conformity with IEEE 802.15.4 may be used.

The charging device 120 supplies the power to the battery devices 200, 300a, 300b, and 300c or receives the power from the battery devices 200, 300a, 300b, and 300c. The supply of the power from the charging device 120 to the battery devices 200, 300a, 300b, and 300c and the reception of the power from the battery devices 200, 300a, 300b, and 300c to the charging device 120 are all performed according to a power transmission scheme (wireless power transmission) in which electrodes are not physically connected to each other.

Examples of the wireless power transmission include power transmission types such as an electromagnetic induction type and a magnetic resonance type. The electromagnetic induction type is better than the magnetic resonance type in a power transmission efficiency, but a coil of a power feeding side and a coil of a power receiving side have to face each other. On the other hand, the magnetic resonance type is worse than the electromagnetic induction type in the power transmission efficiency, but has the advantage that a power transmission distance is longer than in the electromagnetic induction type.

In the embodiment of the present invention, the wireless power transmission type is not particularly limited. As will be described below, however, the magnetic resonance type is preferably used in consideration of the fact that the plurality of battery devices 200 are stacked on the charging device 120 so that each of the battery devices 200 can be charged.

Accordingly, the charging device 120 preferably has a communication scheme by which wireless communication is performed with the charging control device 110 or the battery devices 200, 300a, 300b, and 300c therein. As the wireless communication scheme, for example, communication using radio frequency identification (RFID) technology, a wireless communication scheme standardized in conformity with IEEE 802.15, and a short-range wireless communication scheme (Zigbee) standardized in conformity with IEEE 802.15.4 may be used.

The battery devices 200, 300a, 300b, and 300c each include a secondary cell therein. Therefore, by supplying the power from the charging device 120 through wireless power transmission, the power can be stored in the internal secondary cell.

The battery devices 200, 300a, 300b, and 300c can supply the stored power to the charging device 120 under the control of the charging control device 110. Accordingly, the battery devices 200, 300a, 300b, and 300c preferably have a communication scheme by which wireless communication is performed with the charging control device 110 or the charging device 120 therein. As the wireless communication scheme, for example, communication using radio frequency identification (RFID) technology, a wireless communication scheme standardized in conformity with IEEE 802.15, and a short-range wireless communication scheme (Zigbee) standardized in conformity with IEEE 802.15.4 may be used.

The charging control system 100 or the battery devices 200, 300a, 300b, and 300c preferably have the communication scheme therein, as described above, and may communicate with the outside to inform the outside of the states of the secondary cells installed inside the battery devices 200, 300a, 300b, and 300c using the communication scheme.

The shapes of the charging control device 110, the charging device 120, and the battery devices 200, 300a, 300b, and 300c will be described in detail below. The battery devices 300a, 300b, and 300c are smaller than the battery device 200 in size and have easily portable shapes. The battery devices 200, 300a, 300b, and 300c can be extracted for use in each home or the like after the battery devices 200, 300a, 300b, and 300c are charged by the charging control system 100. Therefore, when the capacity of each internal secondary cell is completely consumed or is reduced, the battery devices 200, 300a, 300b, and 300c can be brought to a place at which the charging control system 100 is installed to be charged by the charging control system 100.

For example, the charging control system 100 can be installed in a public facility of a school, a government office, a hospital or the like, to which power is normally supplied. The secondary cells included in the battery devices 200, 300a, 300b, and 300c can be charged by the charging control system 100 installed in the facility to which the power is normally supplied.

In the battery device 200, for example, sixteen lithium-ion secondary cells connected in series therein are connected in parallel in eight rows. Needless to say, the kinds or number of secondary cells according to the embodiment of the present invention is, of course, not limited to the above example.

Thus, since the power supply system 1 has the above-described configuration, a user can use electric energy when the user desires to use the electric energy. Further, since the power supply system 1 is easy to increase or decrease and it is not necessary to install power wires, the initial investment of infrastructures can be reduced.

The example of the overall configuration of the power supply system 1 according to the embodiment of the present invention has been described with reference to FIG. 1. Next, an example of a specific structure of each device of the power supply system 1 shown in FIG. 1 will be described.

[1-2. Example of Specific Structure of Each Device]

Figure 2B:
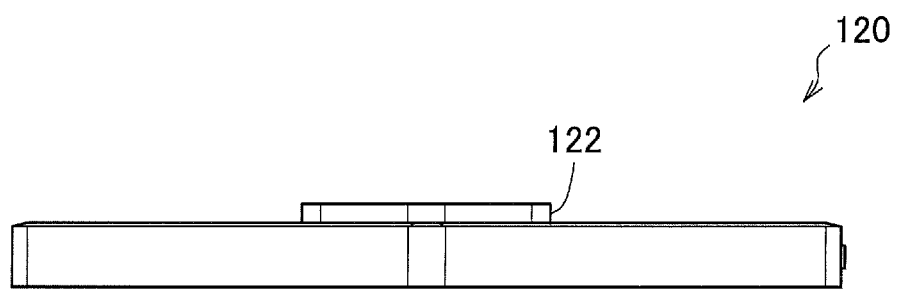
FIG. 2B is an illustration of the outer appearance of the charging device 120 according to the embodiment of the present invention.
Figure 2C:
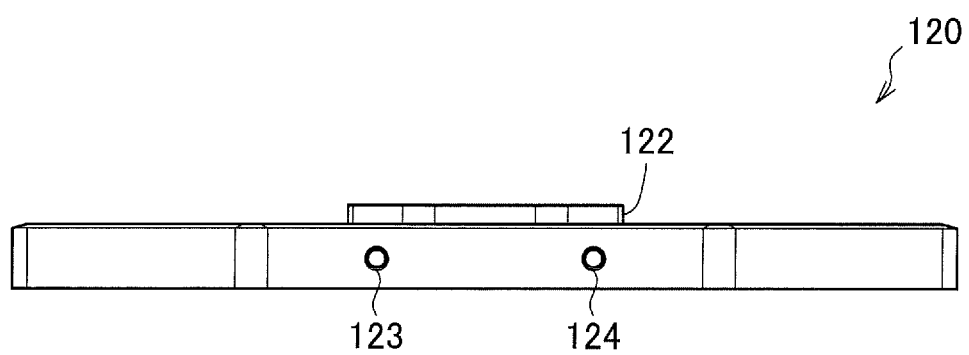
FIG. 2C is an illustration of the outer appearance of the charging device 120 according to the embodiment of the present invention.

FIGS. 2A to 2D are illustrations of the outer appearance of the charging device 120 according to the embodiment of the present invention. FIG. 2A is a top view illustrating the charging device 120 according to the embodiment of the present invention. FIG. 2B is a side view illustrating the charging device 120 according to the embodiment of the present invention. FIG. 2C is a front view illustrating the charging device 120 according to the embodiment of the present invention.

Figure 2D:
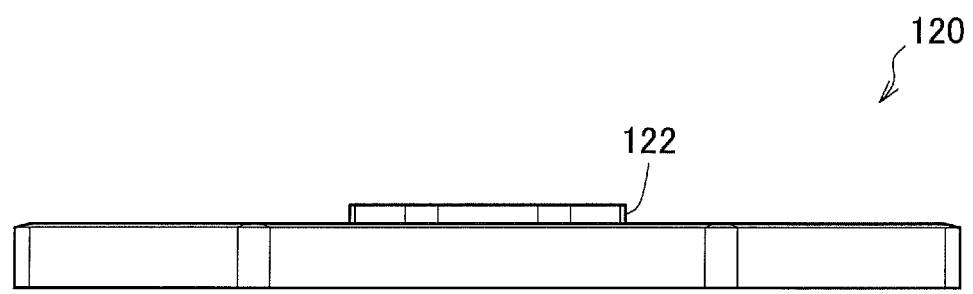
FIG. 2D is an illustration of the outer appearance of the charging device 120 according to the embodiment of the present invention.

FIG. 2D is a rear view illustrating the charging device 120 according to the embodiment of the present invention.

As shown in FIGS. 2A to 2D, the charging device 120 according to the embodiment of the present invention has a substantially regular hexagonal shape. As shown in FIGS. 2A to 2D, the charging device 120 according to the embodiment of the present invention has a substantially regular hexagonal hollow hole 121 in a substantially middle portion of the plane. The charging device 120 includes a convex portion 122 protruding by a predetermined height from the plane around the hole 121.

Thus, by forming the hole 121 and the convex portion 122 in the charging device 120, the battery device 200 can be stably installed in the charging device 120, when the battery device 200 is stacked on the charging device 120 and is charged.

As shown in FIGS. 2A to 2D, the charging device 120 according to the embodiment of the present invention includes an input terminal 123 that is supplied with power and an output terminal 124 that outputs the power. The charging device 120 receives, from the input terminal 123, power generated by the power plant 10, power generated when the solar cell 20 receives irradiation of sun-light, and power generated when the wind power generator 30 receives wind power. The charging device 120 supplies the received power to the battery device 200. Needless to say, the positions of the input terminal 123 and the output terminal 124 are, of course, not limited to the positions shown in the drawings.

Figure 3A:
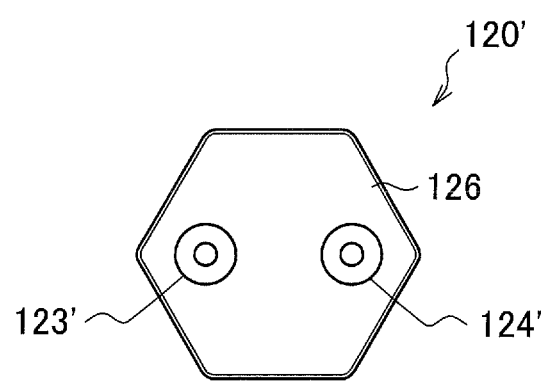
FIG. 3A is an illustration of another structure of the charging device 120.
Figure 3B:
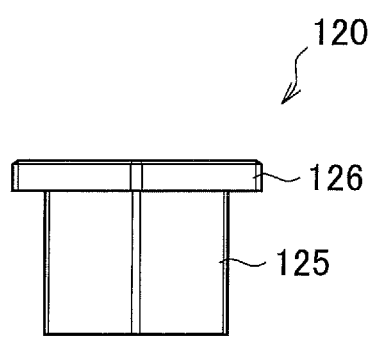
FIG. 3B is an illustration of another structure of the charging device 120.
Figure 3C:
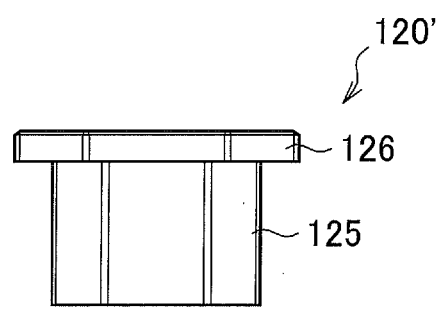
FIG. 3C is an illustration of another structure of the charging device 120.
Figure 3D:
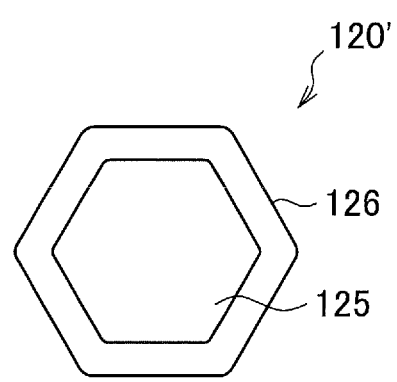
FIG. 3D is an illustration of another structure of the charging device 120.

FIGS. 3A to 3D are illustrations of another structure of the charging device 120 according to the embodiment of the present invention. FIG. 3A is a top view illustrating a charging device 120' according to the embodiment of the present invention. FIG. 3B is a side view illustrating the charging device 120' according to the embodiment of the present invention. FIG. 3C is a front view illustrating the charging device 120' according to the embodiment of the present invention. FIG. 3D is a bottom view illustrating the charging device 120' according to the embodiment of the present invention.

The charging device 120' has a shape which can be inserted into a hole 201 of the battery device 200 to be described below. Specifically, as shown in FIGS. 3A to 3D, the charging device 120' includes an input terminal 123' and an output terminal 124' that are installed in an upper portion of a main body 125 having a substantially regular hexagonal bottom surface, and includes a locking portion 126 that has a substantially regular hexagonal shape larger than the substantially regular hexagonal shape of the bottom surface of the main body 125. The input terminal 123' and the output terminal 124' are terminals that are provided with power and output the power, as in the input terminal 123 and the output terminal 124 described above.

By inserting the charging device 120' into the hole 201 of the battery device 200, contactless power transmission and reception between the charging device 120' and the battery device 200 can be realized. Further, the contactless power transmission and reception mentioned here refer to movement of electric energy without physical contact realized by connectors or the like.

Figure 4A:
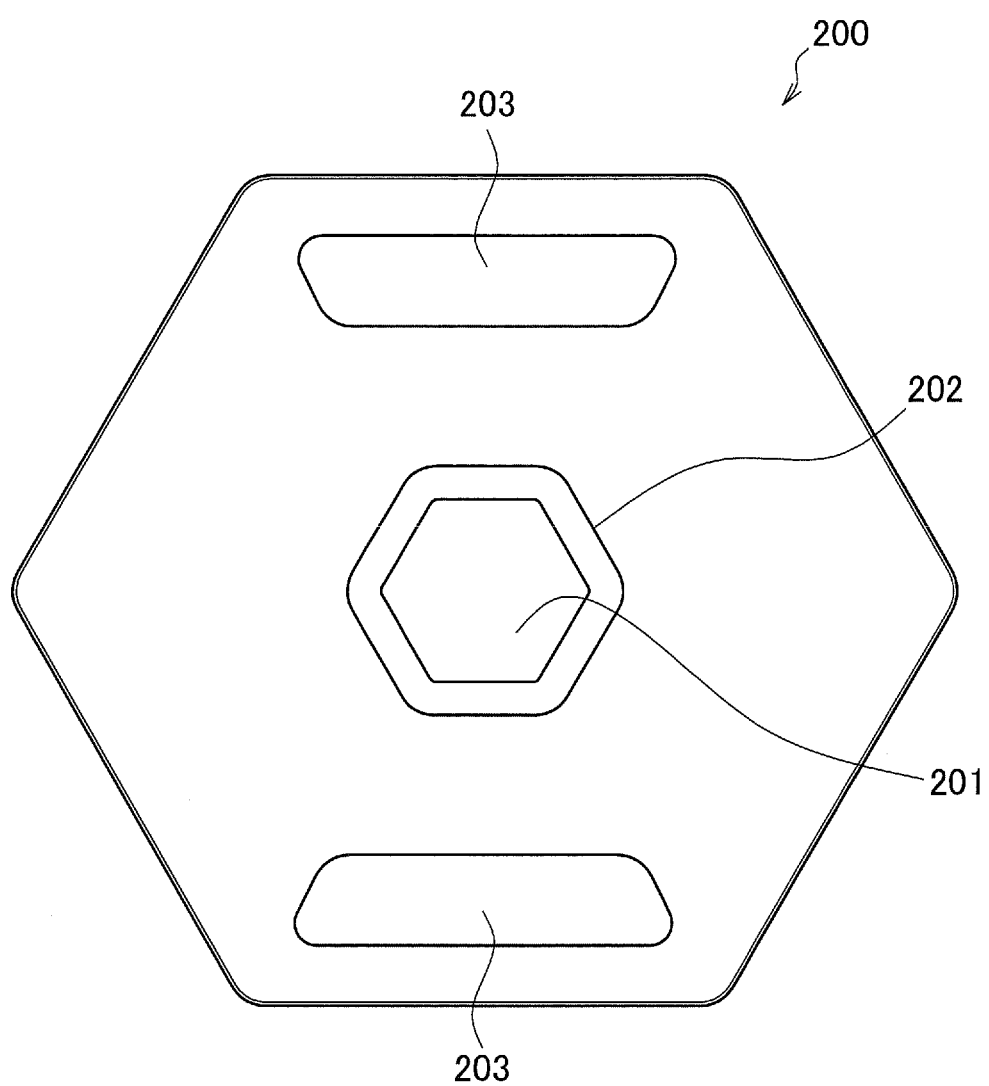
FIG. 4A is an illustration of the outer appearance of a battery device 200.
Figure 4B:
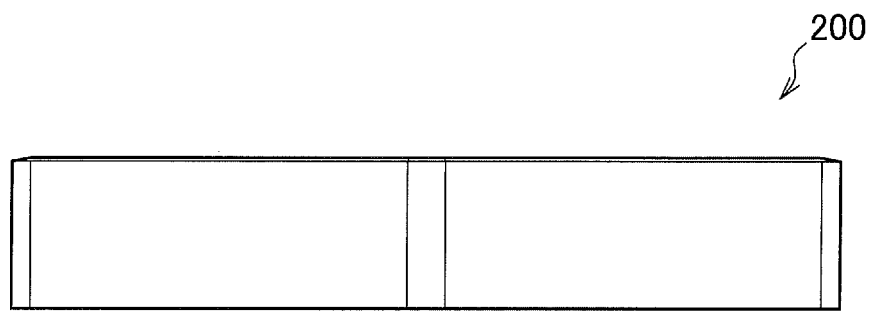
FIG. 4B is an illustration of the outer appearance of the battery device 200.
Figure 4C:
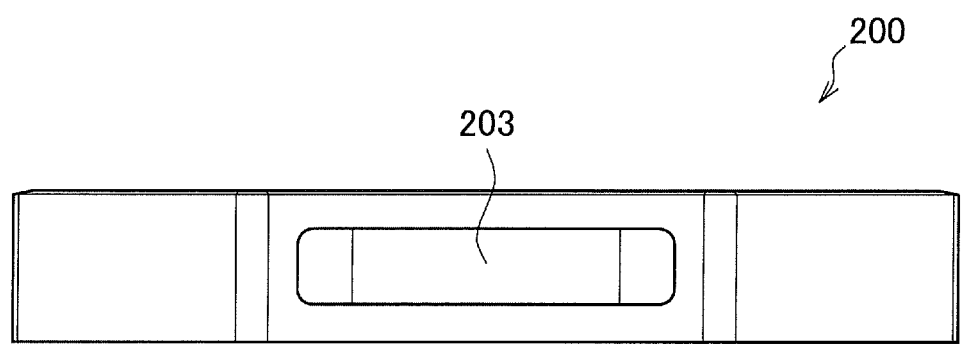
FIG. 4C is an illustration of the outer appearance of the battery device 200.

FIGS. 4A to 4C are illustrations of the structure of the battery device 200 according to the embodiment of the present invention. FIG. 4C is a top view illustrating the battery device 200 according to the embodiment of the present invention. FIG. 4B is a side view illustrating the battery device 200 according to the embodiment of the present invention. FIG. 4C is a front view illustrating the battery device 200 according to the embodiment of the present invention.

As shown in FIGS. 4A to 4C, the battery device 200 according to the embodiment of the present invention has a substantially regular hexagonal shape. As shown in FIGS. 4A to 4C, the battery device 200 according to the embodiment of the present invention has the substantially regular hexagonal hollow hole 201 in the middle portion of the plane. The battery device 200 has a guide portion 202 around the hole 201.

The size of the plane of the battery device 200 is the same as that of the plane of the charging device 120. The battery device 200 can face the charging device 120 so that the regular hexagonal shapes are maintained and overlap each other in a plan view.

The battery device 200 preferably has a size in which sixteen lithium-ion secondary cells connected in series therein are connected in parallel in eight rows therein, as described above. The size of one lithium-ion battery is, for example, 26 mm in diameter and 65 mm in length.

In the battery device 200, a circuit that supplies power to the lithium-ion secondary cells, a coil that receives power from the charging device 120 or discharges the power to the charging device 120, a wireless communication unit that performs wireless communication with the charging control device 110, or the like are installed in addition to the lithium-ion secondary cells. Accordingly, the battery device 200 also preferably has a size in which the circuit, the coil, the wireless communication unit, or the like can be installed in addition to the lithium-ion secondary cells.

The guide portion 202 can oscillate vertically in the direction in which the substantially regular hexagonal hole 201 is hollow. When the battery device 200 is stacked on the charging device 120, the guide portion 202 is configured to protrude by a predetermined height from the plane of the battery device 200. Thus, the battery device 200 can be stably stacked on the charging device 120. The battery device 200 can be stacked on the charging device 120, irrespective of the front and rear surfaces of the battery device 200.

The outsides of the charging device 120 and the battery device 200 are preferably formed of an integrally molded resin such as plastic. This is because the outsides of the charging device 120 and the battery device 200 are preferably formed of a material having durability, a water-proof property, and dust resistance, since the charging device 120 and the battery device 200 are assumed to be used for a long time and be carried outside.

By inserting the charging device 120' into the hole 201 of the battery device 200, as described above, the contactless power transmission and reception between the charging device 120' and the battery device 200 can be also performed under the control of the charging control device 110.

Various methods of using the power stored in the secondary cells included in the battery device 200 can be considered. For example, the power stored in the secondary cells included in the battery device 200 may be extracted for use through the contactless power transmission. Further, a terminal (not shown) used to output power may be included in the battery device 200 and the power may be extracted for use from the terminal.

Handles 203 are formed in side surfaces of the battery device 200. Since the handles 203 are formed in the side surfaces of the battery device 200, the battery device 200 can be easily carried. As shown in FIGS. 4A to 4C, a pair of handles 203 may be formed on the side surfaces facing each other or a handle may be formed at least in one side surface.

Figure 5A:
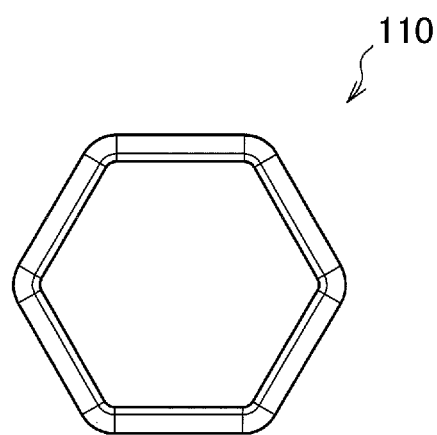
FIG. 5A is an illustration of the structure of a charging control device 110.
Figure 5B:
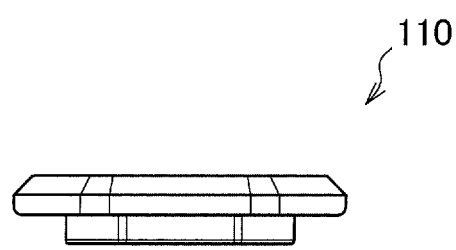
FIG. 5B is an illustration of the structure of the charging control device 110.
Figure 5C:
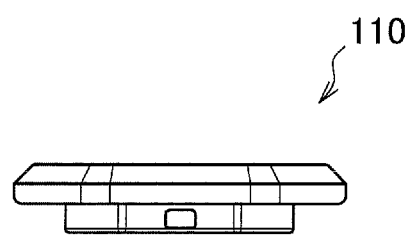
FIG. 5C is an illustration of the structure of the charging control device 110.
Figure 5D:
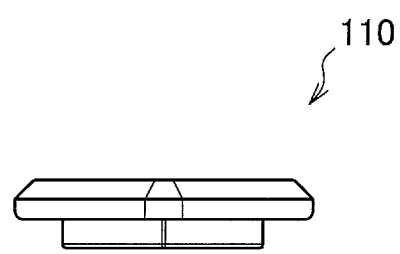
FIG. 5D is an illustration of the structure of the charging control device 110.
Figure 5E:
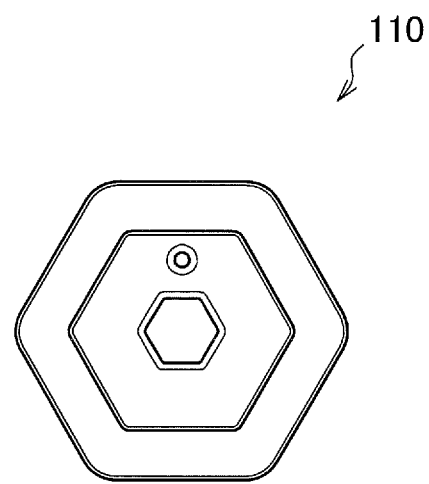
FIG. 5E is an illustration of the structure of the charging control device 110.

FIGS. 5A to 5E are illustrations of the structure of the charging control device 110 according to the embodiment of the present invention. FIG. 5A is a top view illustrating the charging control device 110. FIG. 5B is a front view illustrating the charging control device 110. FIG. 5C is a rear view illustrating the charging control device 110. FIG. 5D is a side view illustrating the charging control device 110. FIG. 5E is a bottom view illustrating the charging control device 110.

The charging control device 110 according to the embodiment of the present invention includes a wireless communication unit, and thus communicates with the charging device 120 or the battery device 200 to control the charging between the charging device 120 and the battery device 200.

As shown in FIGS. 5A to 5E, the charging control device 110 according to the embodiment of the present invention has a plane with a substantially regular hexagonal shape. The charging control device 110 can be fitted into the hole 201 of the battery device 200, when contactless power feeding between the charging device 120 and the battery device 200 is performed.

Figure 6:
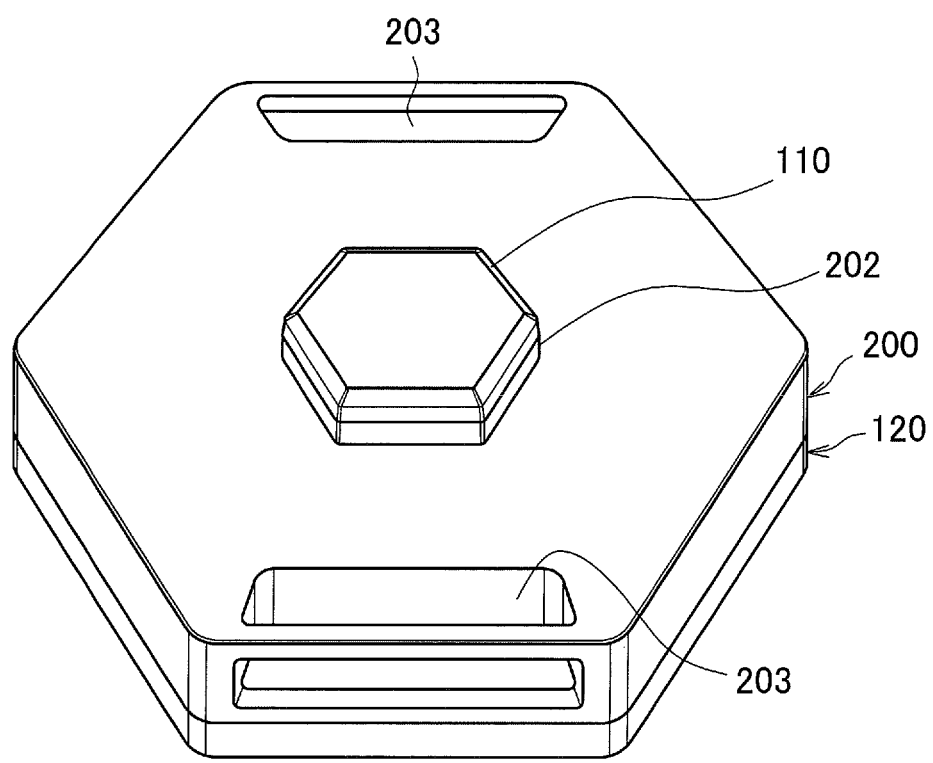
FIG. 6 is an illustration of an installation example when contactless power feeding between the charging device 120 and the battery device 200 is performed.

FIG. 6 is an illustration of an installation example, when the contactless power feeding between the charging device 120 and the battery device 200 is performed, and illustrates a state in which the battery device 200 is stacked on the charging device 120 and the charging control device 110 is inserted into the hole 201 of the battery device 200. Thus, by stacking the battery device 200 on the charging device 120, the contactless power feeding between the charging device 120 and the battery device 200 can be performed, so that the battery device 200 can be charged. Further, by installing the charging control device 110 into the hole 201 of the battery device 200, the contactless power feeding between the charging device 120 and the battery device 200 can be controlled in the space in which the charging device 120 can be installed.

Figure 7:
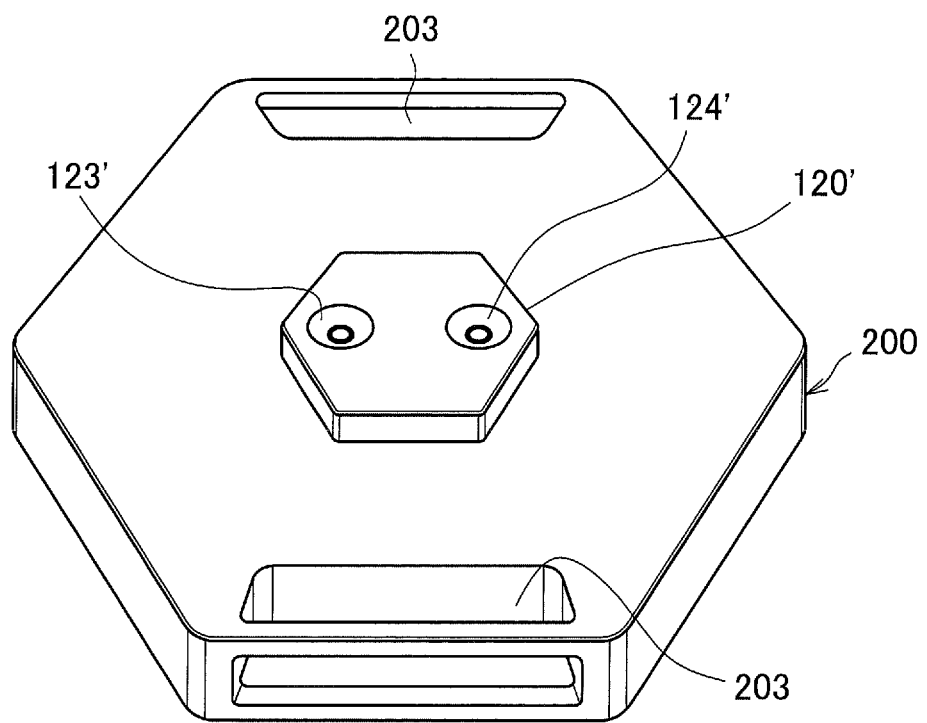
FIG. 7 is an illustration of an installation example when contactless power feeding between a charging device 120' and the battery device 200 is performed.

FIG. 7 is an illustration of an installation example when the contactless power feeding between the charging device 120' and the battery device 200 is performed, and illustrating a state in which the charging device 120' is inserted into the hole 201 of the battery device 200. In FIG. 7, the charging control device 110 is not shown.

As shown in FIG. 7, by inserting the charging device 120' into the hole 201 of the battery device 200, the contactless power feeding between the charging device 120' and the battery device 200 can also be realized under the control of the charging control device 110, so that the battery device 200 can be charged.

Figure 8:
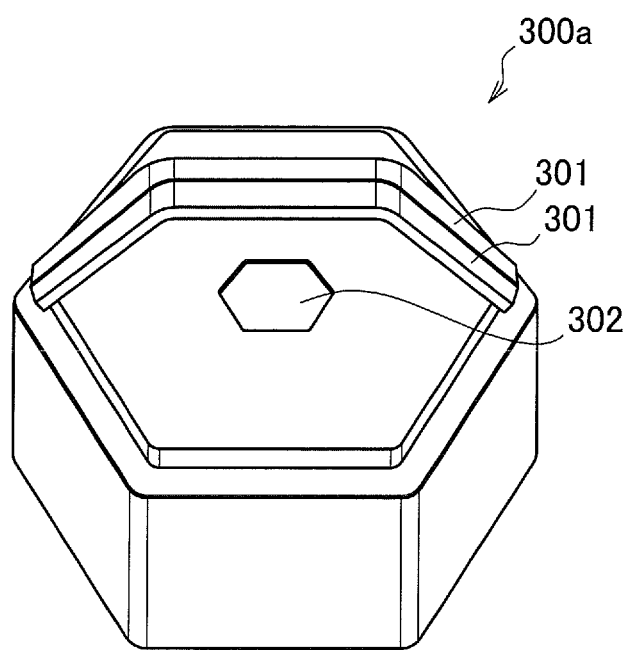

Next, the outer appearance of the battery device 300a according to the embodiment of the present invention will be described. FIG. 8 is a perspective view illustrating the outer appearance of the battery device 300a according to the embodiment of the present invention. FIGS. 9A to 9D are a top view, a front view, a side view, and a bottom view illustrating the battery device 300a according to the embodiment of the present invention, respectively.

As shown in FIGS. 8 and 9A to 9D, the battery device 300a according to the embodiment of the present invention is a rectangular cylinder having a bottom surface with a substantially regular hexagonal shape. As will be described below, by arranging the battery device 300a over the charging device 120 or the battery device 200, the contactless power feeding from the charging device 120 is realized. Accordingly, the battery device 300a includes a power reception unit such as a coil by which contactless power transmission and reception with the charging device 120 or the battery device 200 can be realized.

Figure 9A:
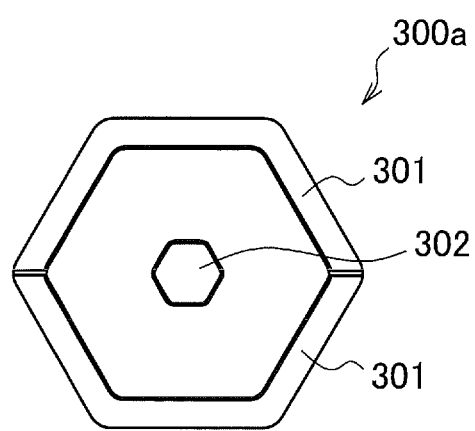
Figure 9B:
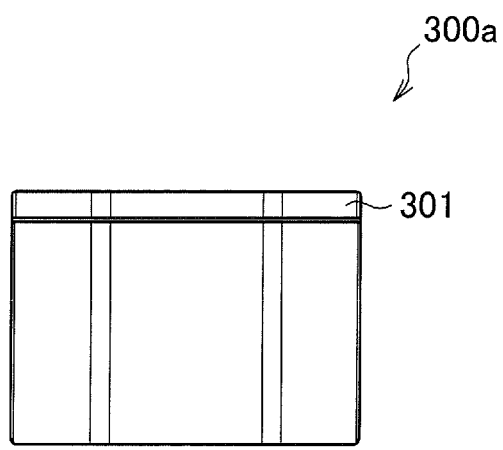
Figure 9C:
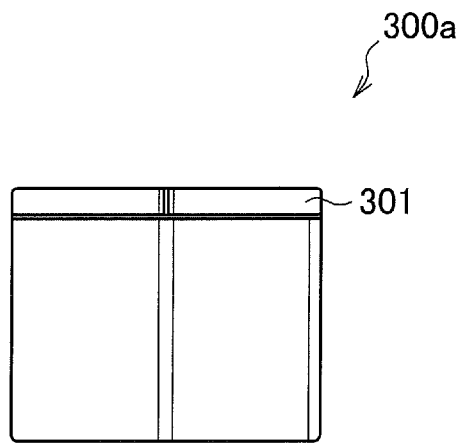
Figure 9D:
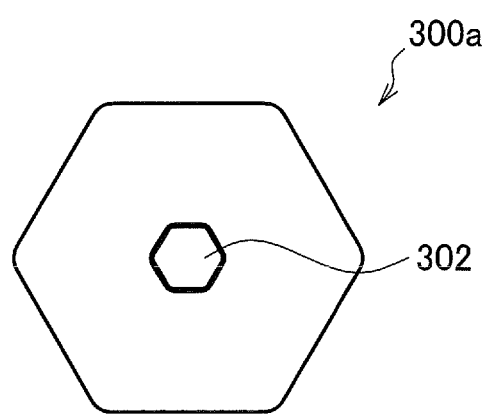

As shown in FIGS. 8 and 9A to 9D, the battery device 300a has a handle 301 used to easily carry the battery device 300a. As shown in FIG. 9D, the battery device 300a includes a supporting member 302. A hole in which the supporting member 302 is installed can be fitted into a convex portion 401 of a charging tray 400 to be described below. When the battery device 300a is installed in the charging tray 400, the supporting member 302 protrudes by a predetermined height from the upper surface of the battery device 300a. Using the supporting member 302, the battery device 300a can be stacked on or arranged in the charging tray 400 to be described below.

Various methods of using the power stored in the secondary cells included in the battery device 300a can be considered. For example, the power stored in the secondary cells included in the battery device 300a may be extracted for use through the contactless power transmission. Further, a terminal (not shown) used to output power may be included in the battery device 300a and the power may be extracted for use from the terminal.

The battery device 300a may be charged through the battery device 200. In order to charge the battery device 300a through the battery device 200, the charging tray 400 to be described below may first be placed on the battery device 200 and the battery device 300a may be installed in the charging tray 400.

The outer appearance of the battery device 300a according to the embodiment of the present invention has described. Next, charging and discharging control performed by the charging control system 100 according to the embodiment of the present invention will be described.

[1-3. Charging and Discharging Control Processes]

Figure 10:
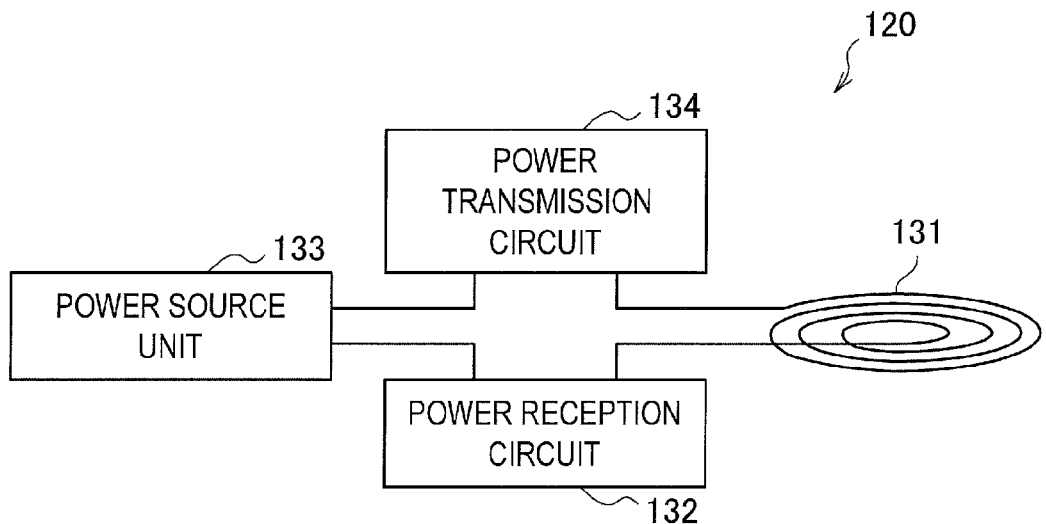
FIG. 10 is an illustration of a functional configuration of the charging device 120.

FIG. 10 is an illustration of a functional configuration of the charging device 120 according to the embodiment of the present invention. Hereinafter, the functional configuration of the charging device 120 according to the embodiment of the present invention will be described with reference to FIG. 10.

As shown in FIG. 10, the charging device 120 according to the embodiment of the present invention includes a coil 131, a power reception circuit 132, a power source unit 133, and a power transmission circuit 134.

The coil 131 performs contactless power transmission and reception to and from a coil located at a distant position. Specifically, the battery device 200 is placed on the charging device 120. Therefore, when a charging process starts under the control of the charging control device 110, the power can be transmitted and received between the coil 131 and a coil 211 of the battery device 200 to be described below.

Regardless of how the battery device 200 is placed on the charging device 120, the coil 131 is preferably wound inside the charging device 120 so that the entire surface on which the battery device 200 is placed is covered centering on a hollow portion of the charging device 120, in order to perform the contactless power transmission and reception between the coil 131 of the charging device 120 and the coil 211 of the battery device 200.

The power reception circuit 132 is a circuit that performs contactless power reception or detects that the coil 131 receives the power. Although not illustrated, the power reception circuit 132 includes a capacitor having a predetermined capacity or a resistor having a predetermined resistance value in order to perform the contactless power reception. The battery device 200 can be placed on the charging device 120. Therefore, when the charging process is performed under the control of the charging control device 110, the power reception circuit 132 supplies the power received by the coil 131 to the power source unit 133. Then, when the power reception circuit 132 detects that the amount of power stored in the power source unit 133 reaches a predetermined amount, the supply of the power received by the coil 131 to the power source unit 133 is stopped.

The power source unit 133 is a unit that can store the power to be supplied to the battery device 200 via the power transmission circuit 134 and the coil 131. The power source unit 133 may be configured such that the power supplied from the outside of the charging device 120 is supplied to the battery device 200 via the power transmission circuit 134 and the coil 131, or a battery having a given capacity may be installed inside.

The power transmission circuit 134 is a unit that outputs the power from the power source unit 133 to the coil 131 in order to supply the power to the battery device 200. Although not illustrated, the power transmission circuit 134 includes a capacitor having a predetermined capacity or a resistor having a predetermined resistance value in order to perform the contactless power transmission. The battery device 200 can be placed on the charging device 120. Therefore, under the control of the charging control device 110, when the charging device 120 starts the charging process of charging the battery device 200, the power transmission circuit 134 outputs the power from the power source unit 133 to the coil 131. When the power from the power source unit 133 is output to the coil 131 by the power transmission circuit 134 and a current thus flows in the coil 131, the contactless power feeding between the charging device 120 and the battery device 200 starts.

The functional configuration of the charging device 120 according to the embodiment of the present invention has been described with reference to FIG. 10. Next, a functional configuration of the battery device 200 according to the embodiment of the present invention will be described.

Figure 11:
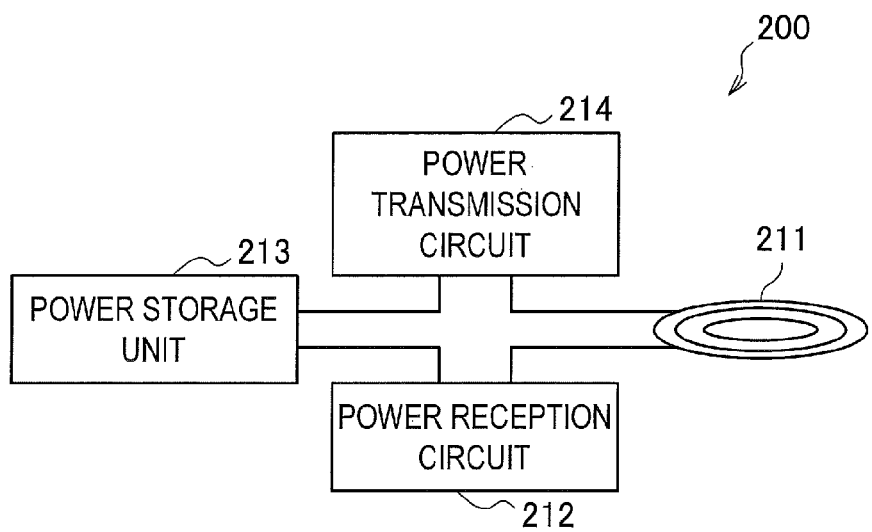
FIG. 11 is an illustration of a functional configuration of the battery device 200.

FIG. 11 is an illustration of the functional configuration of the battery device 200 according to the embodiment of the present invention. Hereinafter, the functional configuration of the battery device 200 according to the embodiment of the present invention will be described with reference to FIG. 11.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

As shown in FIG. 11, the battery device 200 according to the embodiment of the present invention includes a coil 211, a power reception circuit 212, a power storage unit 213, and a power transmission circuit 214.

The coil 211 performs contactless power transmission and reception to and from a coil located at a distant position. Specifically, the battery device 200 is placed on the charging device 120. Therefore, when a charging process starts under the control of the charging control device 110, the power can be transmitted and received between the coil 211 and a coil 131 of the charging device 120.

The power reception circuit 212 is a circuit that performs contactless power reception or detects that the coil 211 receives the power. Although not illustrated, the power reception circuit 212 includes a capacitor having a predetermined capacity or a resistor having a predetermined resistance value in order to perform the contactless power reception. The battery device 200 can be placed on the charging device 120. Therefore, when the charging process is performed under the control of the charging control device 110, the power reception circuit 212 supplies the power received by the coil 211 to the power storage unit 213. Then, when the power reception circuit 212 detects that the amount of power stored in the power storage unit 213 reaches a predetermined amount, the supply of the power received by the coil 211 to the power storage unit 213 is stopped.

The power storage unit 213 stores the power received by the coil 211 and supplied from the power reception circuit 212. The power stored in the power storage unit 213 can be supplied to the outside via the power transmission circuit 214 and the coil 211. Accordingly, the power storage unit 213 may be configured by a secondary cell that has a predetermined capacity.

The power transmission circuit 214 is a unit that outputs the power from the power storage unit 213 to the coil 211 in order to supply the power from the coil 211 to the outside (for example, the charging device 120). Although not illustrated, the power transmission circuit 214 includes a capacitor having a predetermined capacity or a resistor having a predetermined resistance value in order to perform the contactless power transmission. The battery device 200 can be placed on the charging device 120. Therefore, when the process of transmitting the power from the battery device 200 to the charging device 120 starts under the control of the charging control device 110, the power transmission circuit 214 outputs the power from the power storage unit 213 to the coil 211. When the power from the power storage unit 213 is output to the coil 211 by the power transmission circuit 214 and a current thus flows in the coil 211, the contactless power feeding between the charging device 120 and the battery device 200 starts.

The functional configuration of the battery device 200 according to the embodiment of the present invention has been described with reference to FIG. 11. Next, power transmission and reception between the charging device 120 and the battery device 200 will be described according to the embodiment of the present invention.

Figure 12A:
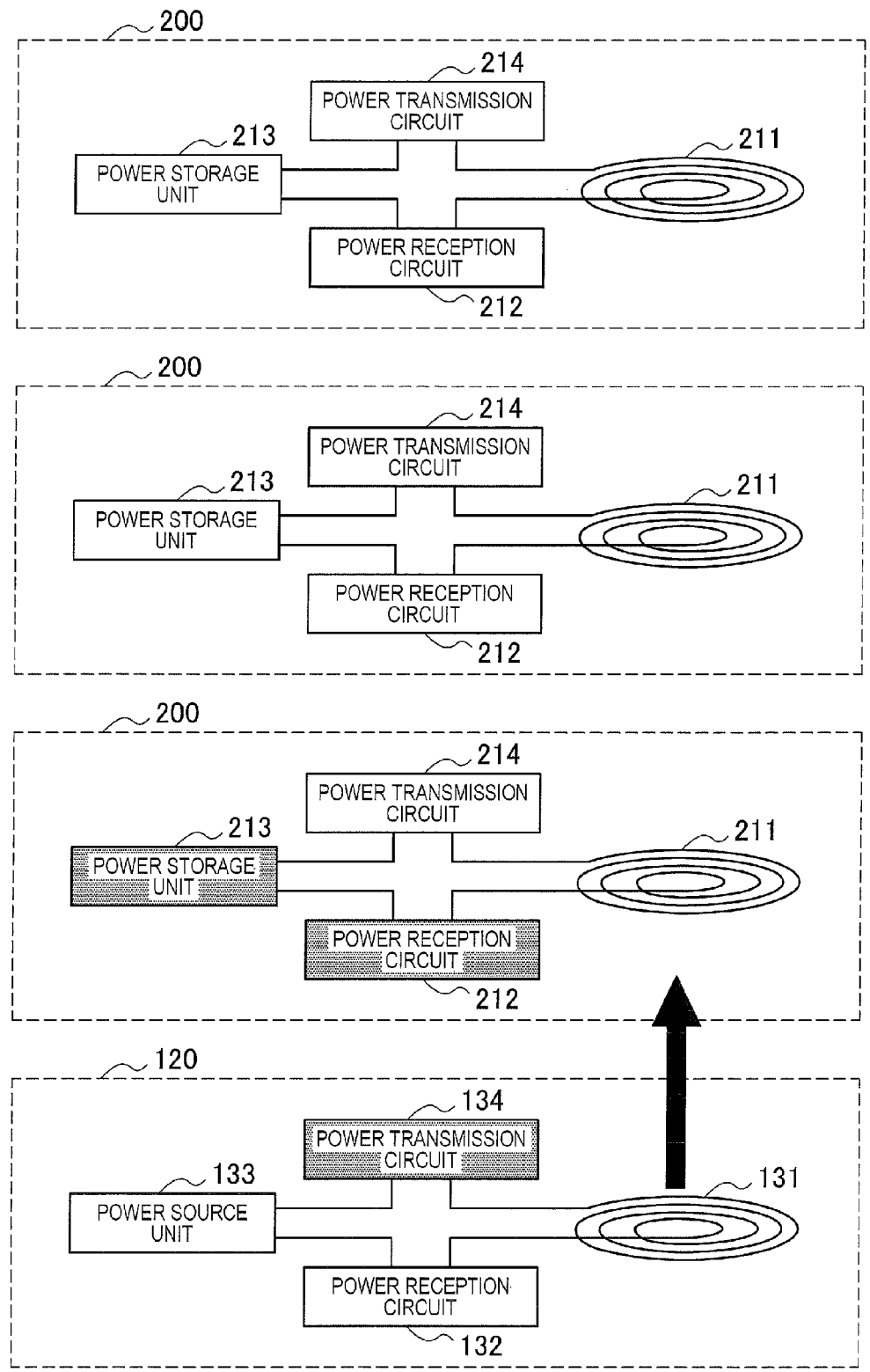
FIG. 12A is an illustration of the overview of contactless power transmitting and receiving processes for power between the charging device 120 and the battery devices 200 according to the embodiment of the present invention.
Figure 12B:
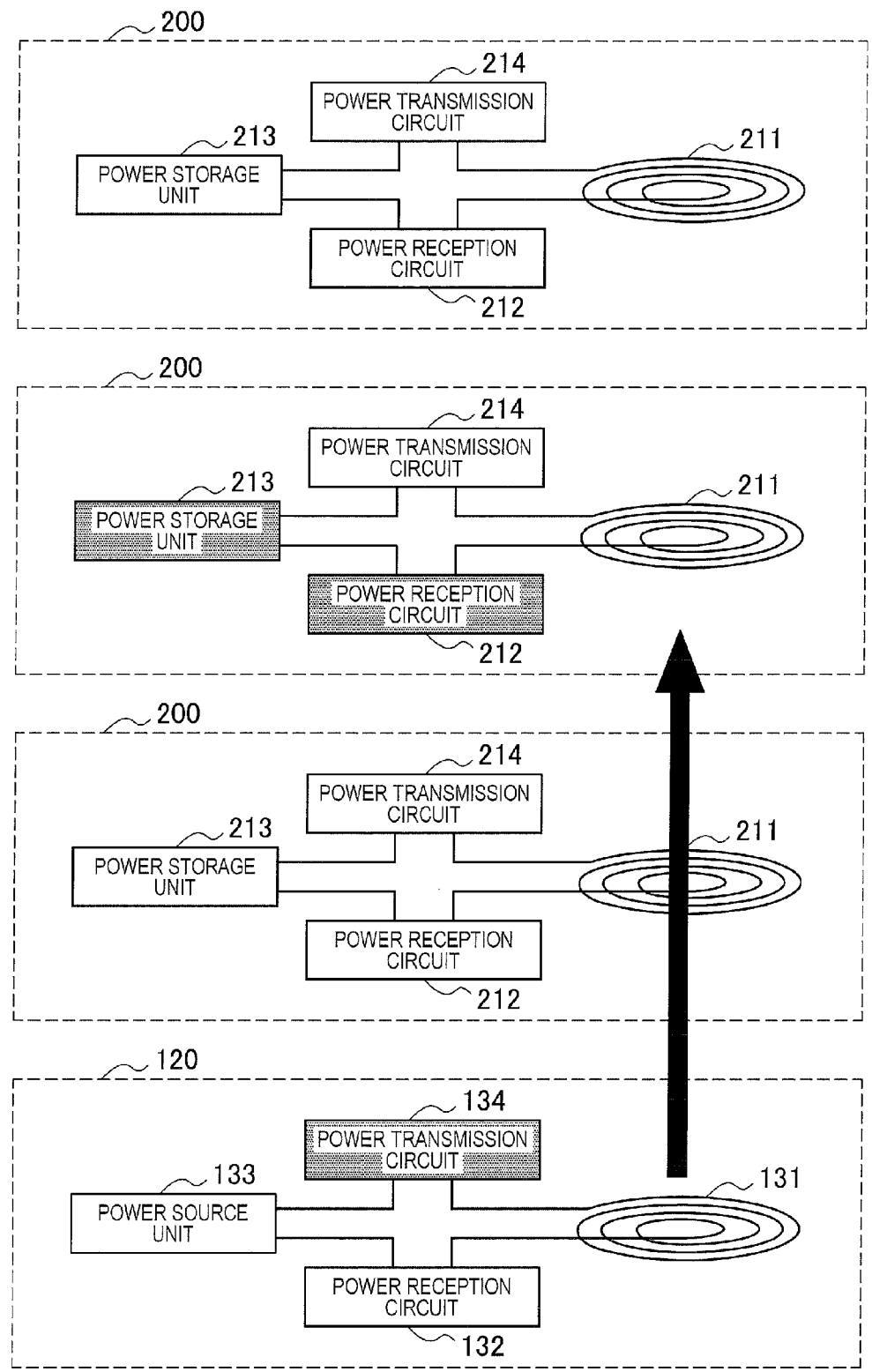
FIG. 12B is an illustration of the overview of the contactless power transmitting and receiving processes for power between the charging device 120 and the battery devices 200 according to the embodiment of the present invention.
Figure 12C:
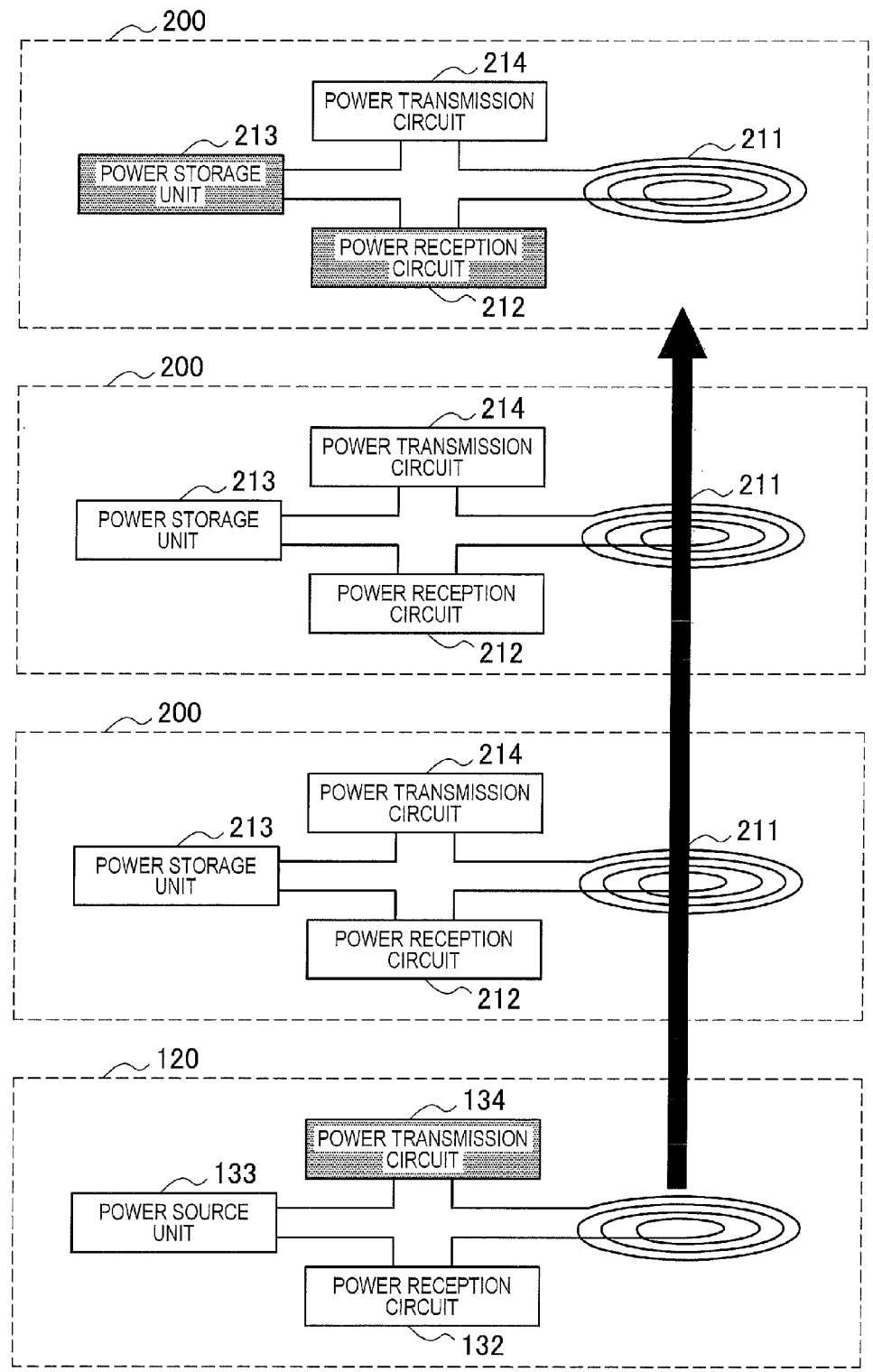
FIG. 12C is an illustration of the overview of the contactless power transmitting and receiving processes for power between the charging device 120 and the battery devices 200 according to the embodiment of the present invention.

FIGS. 12A to 12C are illustrations of the overview of the contactless power transmission and reception between the charging device 120 and the battery devices 200 according to the embodiment of the present invention. FIGS. 12A to 12C show a case in which three battery devices 200 are stacked on the charging device 120 and the contactless power transmission and reception between the charging device 120 and the three battery devices 200 are performed under the control of the charging control device 110. Next, the contactless power transmission and reception between the charging device 120 and the battery devices 200 will be described with reference to FIGS. 12A to 12C according to the embodiment of the present invention.

Hereinafter, the description will be made on the assumption that the three battery devices 200 are stacked in the order of battery devices 200a, 200b, and 200c from the lower side.

In FIGS. 12A to 12C, an operation in which contactless power transmission from the charging device 120 to the battery devices 200 is performed under the control of the charging control device 110 is shown. First, the charging control device 110 communicates with the charging device 120 and the battery devices 200 and performs initial setting to collect information regarding the charging device 120 and the battery devices 200. The initial setting may include a process of acquiring the number of battery devices 200 stacked on the charging device 120 and a process of designating a sequence in which the battery devices 200 are charged.

An identification number may be allocated to the charging device 120. Alternatively, a storage unit such as a memory may be prepared inside the charging device 120 and the identification number of the charging device 120 may be retained in the storage unit.

When the plurality of battery devices 200 are present, an identification number may be allocated to each of the battery devices 200 so that the battery devices 200 can be individually identified. Alternatively, a storage unit such as a memory may be prepared inside each battery device 200 and the identification number of each battery device 200 may be retained in the storage unit.

In the initial setting, the identification numbers retained in the charging device 120 or the battery devices 200 may be transmitted to the charging control device 110. By transmitting the identification numbers from the charging device 120 or the battery devices 200 to the charging control device 110, the charging control device 110 can understand how much the charging device 120 outputs the power to charge the battery devices 200 or how much of the power is used by which battery device 200.

When the charging control device 110 understands the power use status of the individual charging device 120 or battery devices 200, for example, the charging control device 110 can determine the battery device 200 to be preferentially charged or understand a power use amount necessary for an accounting process for users of the individual battery devices 200.

When the charging control device 110 completes the initial setting, the charging device 120 continuously performs the contactless power transmission to the lowermost stacked battery device 200a.

More specifically, as shown in FIG. 12A, the power transmission circuit 134 of the charging device 120 operates to transmit the power from the power source unit 133 to the lowermost stacked battery device 200a via the coil 131.

The battery device 200a receiving the power transmitted from the charging device 120 through the contactless power transmission via the coil 211 causes the power reception circuit 212 to send the power to the power storage unit 213. Thus, the power storage unit 213 of the battery device 200a can store the power transmitted from the charging device 120 through the contactless power transmission therein.

When the power reception circuit 212 detects that the charging of the power in the power storage unit 213 is completed, the battery device 200a transmits a charging completion notification to the charging control device 110 to inform the charging control device 110 of the completion of the charging. When the charging control device 110 receives the charging completion notification from the battery device 200a, the charging control device 110 notifies the charging device 120 of switch of the power transmission destination from the battery device 200a to the battery device 200b.

In the charging device 120 notified of the switch of the power transmission destination by the charging control device 110, the power transmission circuit 134 of the charging device 120 operates to transmit the power from the power source unit 133 to the second stacked battery device 200b from the lower side via the coil 131.

The battery device 200b receiving the power transmitted from the charging device 120 through the contactless power transmission via the coil 211 causes the power reception circuit 212 to send the power to the power storage unit 213. Thus, the power storage unit 213 of the battery device 200b can store the power transmitted from the charging device 120 through the contactless power transmission therein.

When the power reception circuit 212 detects that the charging of the power in the power storage unit 213 is completed, the battery device 200b transmits a charging completion notification to the charging control device 110 to inform the charging control device 110 of the completion of the charging. When the charging control device 110 receives the charging completion notification from the battery device 200b, the charging control device 110 notifies the charging device 120 of switch of the power transmission destination from the battery device 200b to the battery device 200c.

In the charging device 120 notified of the switch of the power transmission destination by the charging control device 110, the power transmission circuit 134 of the charging device 120 operates to transmit the power from the power source unit 133 to the uppermost stacked battery device 200c via the coil 131.

The battery device 200c receiving the power transmitted from the charging device 120 through the contactless power transmission via the coil 211 causes the power reception circuit 212 to send the power to the power storage unit 213. Thus, the power storage unit 213 of the battery device 200c can store the power transmitted from the charging device 120 through the contactless power transmission therein.

Thus, when the power transmission and reception between the charging device 120 and the battery device 200 are performed according to the embodiment of the present invention, the charging device 120 can selectively switch the power transmission destination among the plurality of battery devices 200. As a method of selectively switching the power transmission destination, the charging device 120 can use, for example, a method of changing a frequency used in the contactless power transmission.

The contactless power transmission and reception between the charging device 120 and the battery device 200 according to the embodiment of the present invention have been described with reference to FIGS. 12A to 12C.

Next, contactless power transmission and reception between the charging device 120 and the battery devices 200 according to the embodiment of the present invention will be described with reference to FIGS. 13A to 13C.

Figure 13A:
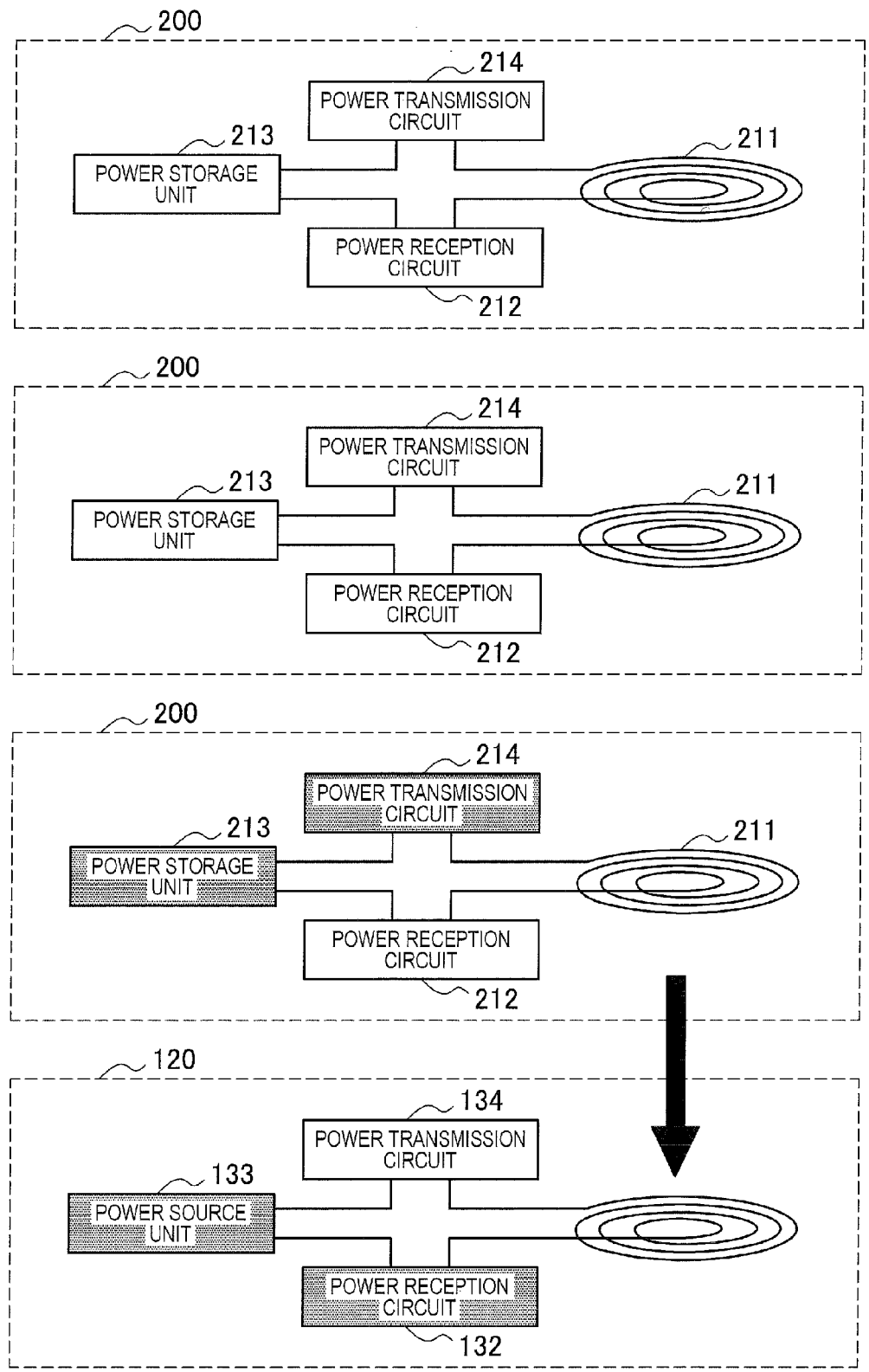
FIG. 13A is an illustration of the overview of contactless power transmitting and receiving processes for power between the charging device 120 and the battery devices 200 according to the embodiment of the present invention.
Figure 13B:
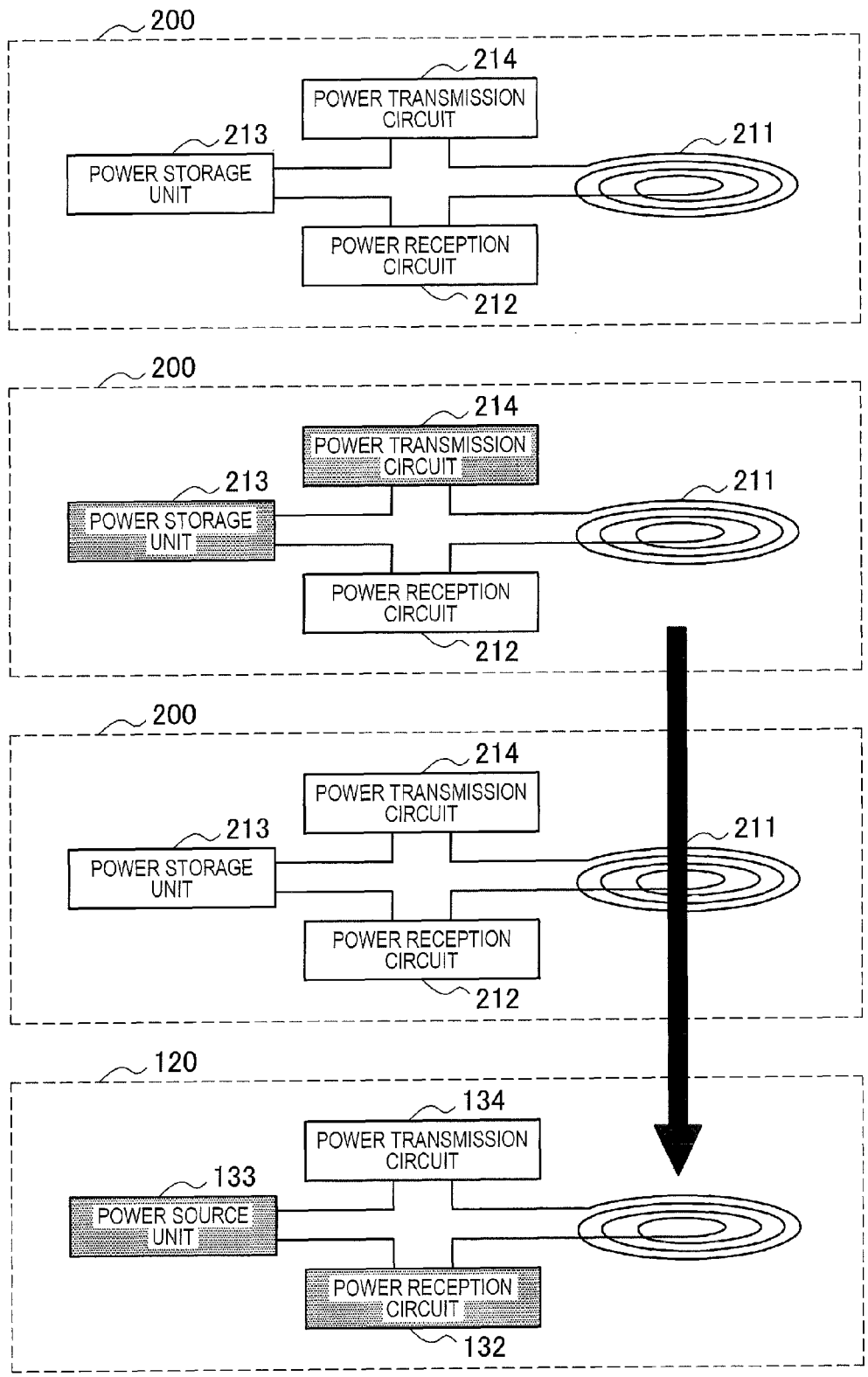
FIG. 13B is an illustration of the overview of the contactless power transmitting and receiving processes for power between the charging device 120 and the battery devices 200 according to the embodiment of the present invention.
Figure 13C:
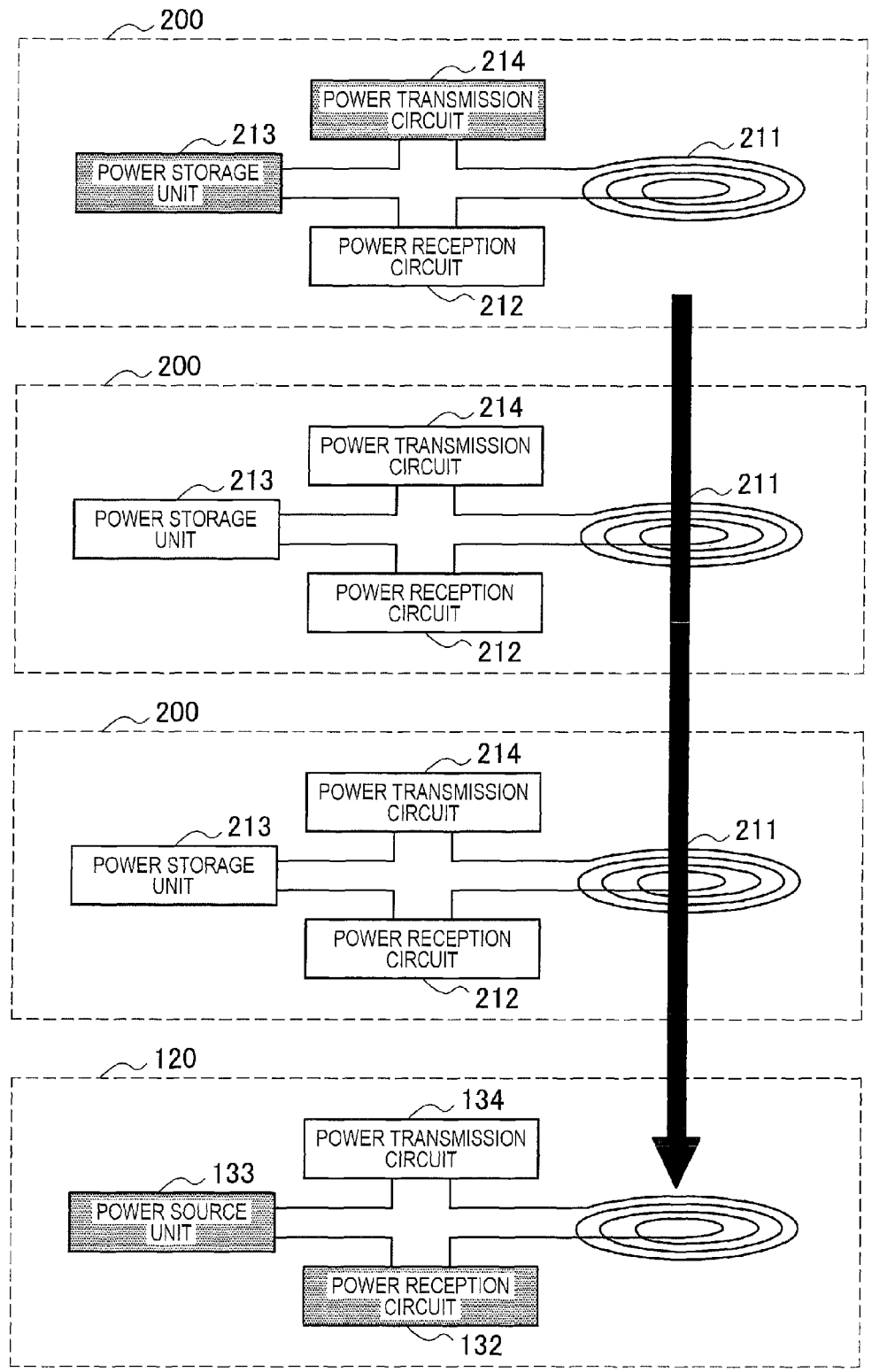
FIG. 13C is an illustration of the overview of the contactless power transmitting and receiving processes for power between the charging device 120 and the battery devices 200 according to the embodiment of the present invention.

FIGS. 13A to 13C are illustrations of the overview of the contactless power transmission and reception between the charging device 120 and the battery devices 200 according to the embodiment of the present invention. FIGS. 13A to 13C show a case in which three battery devices 200 are stacked on the charging device 120 and the contactless power transmission and reception are performed from the three battery devices 200 to the charging device 120 under the control of the charging control device 110. Next, the contactless power transmission and reception between the charging device 120 and the battery devices 200 will be described with reference to FIGS. 13A to 13C according to the embodiment of the present invention.

Hereinafter, the description will be made on the assumption that the three battery devices 200 are stacked in the order of battery devices 200a, 200b, and 200c from the lower side.

In FIGS. 13A to 13C, an operation in which contactless power transmission from the battery devices 200 to the charging device 120 is performed under the control of the charging control device 110 is shown. First, the charging control device 110 communicates with the charging device 120 and the battery devices 200 and performs initial setting to collect information regarding the charging device 120 and the battery devices 200. The initial setting may include a process of acquiring the number of battery devices 200 stacked on the charging device 120 and a process of designating a sequence in which the battery devices 200 performing the power transmission are charged.

An identification number may be allocated to the charging device 120. Alternatively, a storage unit such as a memory may be prepared inside the charging device 120 and the identification number of the charging device 120 may be retained in the storage unit.

When the plurality of battery devices 200 are present, an identification number may be allocated to each of the battery devices 200 so that the battery devices 200 can be individually identified. Alternatively, a storage unit such as a memory may be prepared inside the battery device 200 and the identification number of each battery device 200 may be retained in the storage unit.

In the initial setting, the identification numbers retained in the charging device 120 or the battery devices 200 may be transmitted to the charging control device 110. By transmitting the identification numbers from the charging device 120 or the battery devices 200 to the charging control device 110, the charging control device 110 can understand how much each battery device 200 outputs the power to charge the charging device 120 or how much of the power is used by which battery device 200.

When the charging control device 110 understands the power use status of the individual charging device 120 or battery devices 200, for example, the charging control device 110 can determine which battery device 200 the power is preferentially transmitted from or understand a power use amount necessary for a refund process for users of the individual battery devices 200.

When the charging control device 110 completes the initial setting, the lowermost stacked battery device 200a continuously performs the contactless power transmission to the charging device 120.

More specifically, as shown in FIG. 13A, the power transmission circuit 214 of the battery device 200a operates to transmit the power from the power storage unit 213 to the charging device 120 via the coil 211.

The charging device 120 receiving the power transmitted from the battery device 200a through the contactless power transmission via the coil 131 causes the power reception circuit 132 to send the received power to the power source unit 133. Thus, the power source unit 133 of the charging device 120 can store the power transmitted from the battery device 200a through the contactless power transmission therein or discharge the power to the outside of the charging device 120.

When the power transmission circuit 214 of the battery device 200a detects that the discharging of the power from the power storage unit 213 is completed or the power stored in the power storage unit 213 becomes equal to or less than a predetermined amount of power, the battery device 200a transmits a power transmission completion notification to the charging control device 110 to inform the charging control device 110 of the completion of the power transmission. When the charging control device 110 receives the power transmission completion notification from the battery device 200a, the charging control device 110 notifies the battery device 200b of power transmission to the charging device 120.

In the battery device 200b receiving the power transmission instruction notification from the charging control device 110, the power transmission circuit 214 of the battery device 200b operates to transmit the power from the power storage unit 213 to the charging device 120 via the coil 211.

The charging device 120 receiving the power transmitted from the battery device 200b through the contactless power transmission via the coil 131 causes the power reception circuit 132 to send the received power to the power source unit 133. Thus, the power source unit 133 of the charging device 120 can store the power transmitted from the battery device 200b through the contactless power transmission therein or discharge the power to the outside of the charging device 120.

When the power transmission circuit 214 of the battery device 200b detects that the discharging of the power from the power storage unit 213 is completed or the power stored in the power storage unit 213 becomes equal to or less than a predetermined amount of power, the battery device 200b transmits a power transmission completion notification to the charging control device 110 to inform the charging control device 110 of the completion of the power transmission. When the charging control device 110 receives the power transmission completion notification from the battery device 200b, the charging control device 110 notifies the battery device 200c of power transmission to the charging device 120.

In the battery device 200c receiving the power transmission instruction notification from the charging control device 110, the power transmission circuit 214 of the battery device 200c operates to transmit the power from the power storage unit 213 to the charging device 120 via the coil 211.

The charging device 120 receiving the power transmitted from the battery device 200c through the contactless power transmission via the coil 131 causes the power reception circuit 132 to send the received power to the power source unit 133. Thus, the power source unit 133 of the charging device 120 can store the power transmitted from the battery device 200c through the contactless power transmission therein or discharge the power to the outside of the charging device 120.

Thus, when the power transmission and reception process between the charging device 120 and the battery device 200 are performed according to the embodiment of the present invention, the charging device 120 can selectively receive the power through the contactless reception from the plurality of battery devices 200. As a method of selectively receiving the power through the contactless reception, the charging device 120 can use, for example, a method of changing a frequency used in the contactless power transmission.

The contactless power transmission and reception between the charging device 120 and the battery device 200 according to the embodiment of the present invention have been described with reference to FIGS. 13A to 13C.

Figure 14:
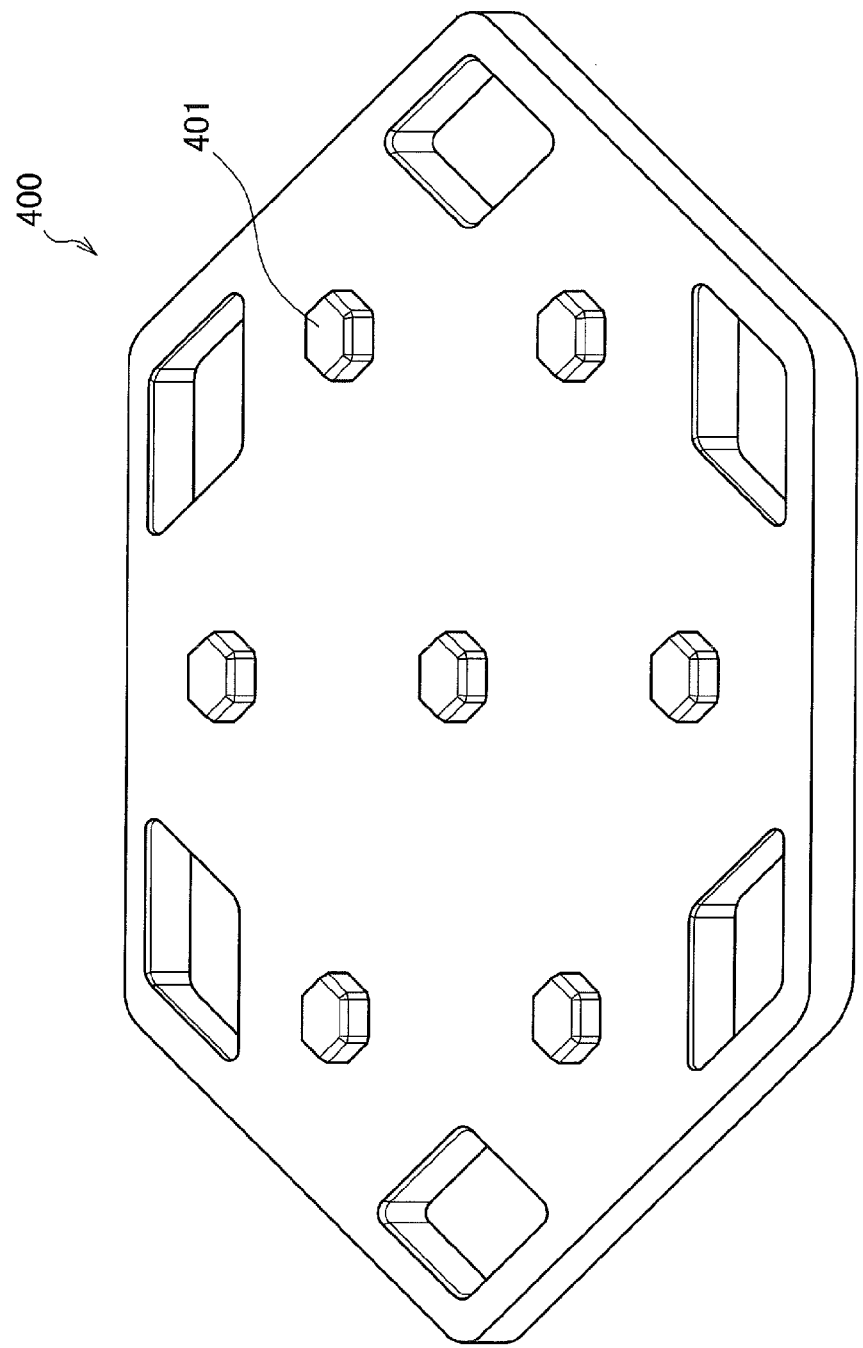
FIG. 14 is an illustration of the outer appearance of a charging tray 400.
Figure 15:
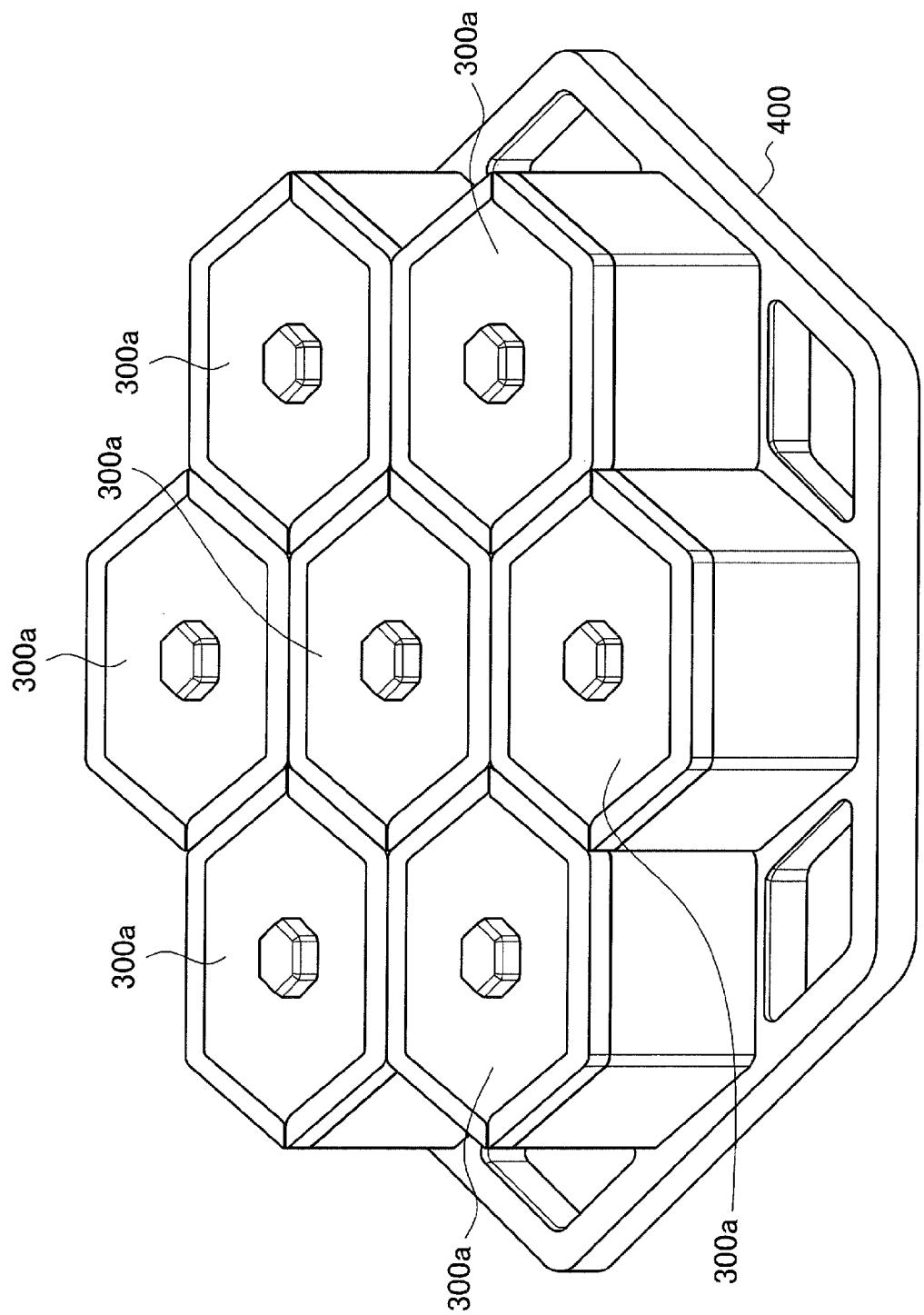

Next, an installation example of the battery device 300a according to the embodiment of the present invention when the battery device 300a is charged will be described. FIG. 14 is an illustration of the outer appearance of the charging tray 400 in which the battery device 300a is installed when the battery device 300a according to the embodiment of the present invention is charged. FIG. 15 is an illustration of a state in which the battery devices 300a are installed in the charging tray 400 to charge the battery devices 300a.

In the charging tray 400 shown in FIG. 14, seven convex portions 401 are formed, as shown in FIG. 14. When the supporting member 302 of each battery device 300a shown in FIG. 9D is fitted into the convex portion 401, the supporting member protrudes by a predetermined height. Thus, the battery devices 300a can be stably installed in the charging tray.

The charging tray 400 shown in FIG. 14 has a plane with the same substantially regular hexagonal shape as the charging device 120 and the battery device 200. The size of the plane of the charging tray 400 is the same as that of the charging device 120 and the battery device 200. Accordingly, when there is an area in which the charging device 120 can be installed placing the charging tray 400 on the charging device 120 or the battery device 200, the battery devices 300a installed in the charging tray 400 can be charged.

Changing of the battery devices 300a, as described above, may be performed through the battery device 200. In order to charge the battery devices 300a through the battery device 200, the charging tray 400 to be described below may first be placed on the battery device 200 and the battery devices 300a may be installed in the charging tray 400.

The power used to charge the battery devices 300a placed on the charging tray 400 may be supplied directly from the charging device 120 or may be supplied from the battery device 200. By supplying the power used to charge the battery devices 300a from the battery device 200, the power once stored in the battery device 200 can be subdivided to the battery devices 300a.

<2. Application Examples>

In the power supply system 1 described above, the contactless power feeding from the charging device 120 to the battery devices 200, 300a, 300b, and 300c can be performed under the control of the charging control device 110. However, predetermined information may be superimposed on the power output from the charging device 120 and the contactless power feeding to the battery devices 200, 300a, 300b, and 300c may be performed.

For example, when a television is operated by the power stored in the battery device 200, advertisement contents for a video may be stored along with the power in the battery device 200 and the advertisement contents may be displayed when the television is used. Further, for example, when a radio, a portable music player, or the like is operated by the power stored in the battery device 300a, audio advertisement contents may be stored along with the power in the battery device 300a and the advertisement contents may be output when the radio, the portable music player, or the like is used.

Since the charging device 120 or the battery device 200 has the substantially regular hexagonal plane shape, the power supply system that is easy to increase or decrease can be realized. For example, since the charging device can be configured by arranging the plurality of charging devices 120 having the substantially regular hexagonal plane shapes, the plurality of charging devices 120 having the substantially regular hexagonal plane shapes may be configured to be joined together.

<3. Summarization>

In the power supply system 1 according to the embodiment of the present invention, as described above, the secondary cells installed inside the battery devices 200 can be charged by stacking the battery devices 200 on the charging device 120 and performing the contactless power feeding from the charging device 120 to the battery devices 200 under the control of the charging control device 110.

By configuring the power supply system 1 in this way, as described above, users can use electric energy, when the users desire to use the electric energy. Further, since the power supply system 1 is easy to increase or decrease and it is not necessary to install power wires, the initial investment of infrastructures can be reduced.

The plurality of battery devices 200 can be stacked on the charging device 120. Accordingly, according to the embodiment of the present invention, the contactless power feeding from the charging device 120 to the plurality of battery devices 200 can be realized, when the plurality of battery devices 200 are stacked on the charging device 120. At this time, by sequentially switching the power feeding destination of the charging device 120 under the control of the charging control device 110, the contactless power feeding to the plurality of battery devices 200 can be performed.

In the above-described embodiment, the charging device 120 and the battery device 200 have the bottom surfaces of the same substantially regular hexagonal shape and each have the main body with a predetermined height, but the present invention is not limited thereto. For example, the bottom surface of the charging device 120 may have a regular hexagonal shape larger than the bottom surface of the battery device 200, and vice versa.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

1 Power supply system
10 Power plant
20 Solar cell
30 Wind power generator
100 Charging control system
110 Charging control device
120 Charging device
121 Hole
122 Convex portion
125 Main body
126 Locking portion
131 Coil
132 Power reception circuit
133 Power source unit
134 Power transmission circuit
200, 300a, 300b, 300c Battery device
201 Hole
202 Guide portion
203 Handle
211 Coil
212 Power reception circuit
213 Power storage unit
214 Power transmission circuit
301 Handle
302 Supporting member
400 Charging tray
401 Convex portion

The invention claimed is:

1. A charging system comprising:
at least one battery device that includes a secondary cell therein;
a charging device that performs contactless power transmission to transmit power to the battery device; and
a charging control device that controls the contactless power transmission between the charging device and the battery device,
wherein the battery device is a hexagonal cylinder having a bottom surface with a substantially regular hexagonal shape and having a predetermined height,
wherein the charging device is a hexagonal cylinder having a bottom surface with a substantially regular hexagonal shape and having a predetermined height, and
wherein the contactless power transmission is performed between the charging device and the battery device under control of the charging control device by stacking the battery device on the charging device.

2. The charging system according to claim 1,
wherein the battery device includes a hole penetrating through a main body of the battery device and a guide portion formed around the hole and stacked on the charging device at a matching position, and
wherein the charging device includes a hole penetrating through a main body of the charging device and a convex portion formed around the hole at a position corresponding to the guide portion to protrude from an upper surface.

3. The charging system according to claim 2, wherein the guide portion oscillates by a predetermined amount in a direction in which the hole penetrates, and protrudes from the main body of the battery device, when the battery device is stacked on the charging device.

4. The charging system according to claim 2, wherein an upper portion of the charging control device has a same size as the guide portion formed in the battery device and a lower portion of the charging control device has a size insertable into the hole.

5. The charging system according to claim 1, wherein bottom surfaces of the battery device and the charging device have same sizes and substantially regular hexagonal shapes.

6. The charging system according to claim 1, wherein a handle is formed on at least one side surface of the battery device.

7. The charging system according to claim 1, further comprising:
- a charging tray that has a bottom surface with a same shape as the battery device; and
- a miniature battery device that is charged by being installed in the charging tray and is a hexagonal cylinder having a bottom surface with a substantially regular hexagonal shape and having a predetermined height.

8. A charging system comprising:
- a battery device that includes a secondary cell therein;
- a charging device that performs contactless power transmission to transmit power to the battery device; and
- a charging control device that controls the contactless power transmission between the charging device and the battery device,
- wherein the battery device is a hexagonal cylinder having a bottom surface with a substantially regular hexagonal shape and having a predetermined height, and includes a hole penetrating through a main body of the battery device, and
- wherein the charging device performs the contactless power transmission, by being inserted into the hole, between the charging device and the battery device under control of the charging control device.

9. The charging system according to claim 8, wherein the battery device further includes a guide portion formed around the hole and stacked on the charging device at a matching position.

10. The charging system according to claim 9, wherein the guide portion oscillates by a predetermined amount in a direction in which the hole penetrates, and protrudes from the main body of the battery device, when the battery device is stacked on the charging device.

11. The charging system according to claim 9, wherein an upper portion of the charging control device has a same size as the guide portion formed in the battery device and a lower portion of the charging control device has a size insertable into the hole.

12. The charging system according to claim 8, wherein bottom surfaces of the battery device and the charging device have same sizes and substantially regular hexagonal shapes.

13. The charging system according to claim 8, wherein a handle is formed on at least one side surface of the battery device.

14. The charging system according to claim 8, further comprising:
- a charging tray that has a bottom surface with a same shape as the battery device; and
- a miniature battery device that is charged by being installed in the charging tray and is a hexagonal cylinder having a bottom surface with a substantially regular hexagonal shape and having a predetermined height.

\* \* \* \* \*